United States Patent [19]

Iwata et al.

[11] Patent Number: 5,638,098
[45] Date of Patent: Jun. 10, 1997

[54] DOCUMENT PROCESSING APPARATUS FOR CONTROLLING FIXATION OF RECORDED INK

[75] Inventors: Kazuya Iwata; Yoshiaki Hayashi, both of Yokohama; Jun Katayanagi, Musashino; Hiroshi Fukui, Yokosuka, all of Japan

[73] Assignee: Canon Kabushiki Kaisha, Tokyo, Japan

[21] Appl. No.: 214,672

[22] Filed: Mar. 21, 1994

Related U.S. Application Data

[63] Continuation of Ser. No. 860,287, Mar. 18, 1992, abandoned, which is a continuation of Ser. No. 540,695, Jun. 20, 1990, abandoned.

[30] Foreign Application Priority Data

| Jun. 20, 1989 | [JP] | Japan | 1-159071 |
| Jun. 20, 1989 | [JP] | Japan | 1-159072 |
| Jun. 20, 1989 | [JP] | Japan | 1-159075 |

[51] Int. Cl.$^6$ .................................................. B41J 2/05
[52] U.S. Cl. ...................... 347/9; 347/102; 347/16
[58] Field of Search .............................. 346/33 R, 25; 347/102, 5, 9, 16; 395/115, 114, 105, 110; 101/488, 424.1

[56] References Cited

U.S. PATENT DOCUMENTS

| 3,893,616 | 7/1975 | Trousdale | 395/105 X |
| 4,069,486 | 1/1978 | Fox | 347/3 |
| 4,313,124 | 1/1982 | Hara . | |
| 4,345,262 | 8/1982 | Shirato et al. . | |
| 4,439,775 | 3/1984 | Johnson | 347/14 |
| 4,453,588 | 6/1984 | Fukui . | |
| 4,459,600 | 7/1984 | Sato et al. . | |
| 4,463,359 | 7/1984 | Ayata et al. . | |
| 4,469,026 | 9/1984 | Irwin | 347/102 X |
| 4,521,813 | 6/1985 | Yoshida | 358/296 |
| 4,558,333 | 12/1985 | Sugitani et al. . | |
| 4,566,014 | 1/1986 | Paranjpe | 347/102 X |
| 4,617,580 | 10/1986 | Miyakawa | 347/14 |
| 4,634,262 | 1/1987 | Imaizumi et al. . | |
| 4,723,129 | 2/1988 | Endo et al. . | |
| 4,740,796 | 4/1988 | Endo et al. . | |
| 4,760,406 | 7/1988 | Sato . | |
| 4,847,638 | 7/1989 | Moriyama | 346/140 |
| 4,933,684 | 6/1990 | Tasaki | 347/102 X |
| 5,006,864 | 4/1991 | Ayata et al. | 347/3 |
| 5,043,748 | 8/1991 | Katayama | 347/16 X |
| 5,155,503 | 10/1992 | Tasaki | 347/102 X |

FOREIGN PATENT DOCUMENTS

| 2716705 | 10/1978 | Germany | B41J 3/04 |
| 2913998 | 11/1983 | Germany | B41J 3/18 |
| 3417376 | 11/1984 | Germany | B41J 3/04 |
| 59-123670 | 7/1984 | Japan | B41J 3/04 |
| 59-138461 | 8/1984 | Japan | B41J 3/04 |
| 61-16860 | 1/1986 | Japan | B41J 3/04 |

*Primary Examiner*—Joseph W. Hartary
*Attorney, Agent, or Firm*—Fitzpatrick, Cella, Harper & Scinto

[57] ABSTRACT

A document processing apparatus includes a developing unit for developing a dot pattern, a recording unit for recording a dot pattern on a recording medium using an ink, a transfer unit for transferring the dot pattern developed by the developing unit to the recording unit, and a transfer control unit for controlling a transfer timing rate of the transfer unit to improve a fixing property of the ink to the recording medium recorded by the recording unit. The transfer timing rate is controlled in accordance with the time required to produce the dot pattern, in accordance with the type of dot pattern to be printed, or with the type of recording medium used.

46 Claims, 26 Drawing Sheets

```
    1 2 3 4 5 6 7 8 9 10 11 12 13 14 15 16 17 18 19 20
1     A   H A P P Y   N E W   Y E A R !
2   · [EXT] I M A G E · [EXT] · T H A N K · Y O U
3   · [EXT] H O R S E · [EXT] F O R   Y O U R · ·
4   · [EXT] · · · · · [EXT] K I N D N E S S · ·
5   · [EXT] · · · · · [EXT] · · · · · · · · ·
6   · [EXT] · · · · · [EXT] G O O D   L U C K !
7   J A N 1 , 1 9 9 0 · · · · · · · ·
```

A HAPPY NEW YEAR!

THANK YOU
FOR YOUR
KINDNESS.

GOOD LUCK!

JAN 1, 1990

```
     1  2  3  4  5  6  7  8  9 10 11 12 13 14 15 16 17 18 19 20
  1     A     H  A  P  P  Y     N  E  W     Y  E  A  R  !
  2     · [EXT] I  M  A  G  E · [EXT] ·  T  H  A  N  K  ·  Y  O  U
  3     · [EXT] H  O  R  S  E · [EXT] F  O  R     Y  O  U  R  ·  ·
  4     · [EXT] ·  ·  ·  ·  · [EXT] K  I  N  D  N  E  S  S  .  ·  ·
  5     · [EXT] ·  ·  ·  ·  · [EXT] ·  ·  ·  ·  ·  ·  ·  ·  ·  ·  ·
  6     · [EXT] ·  ·  ·  ·  · [EXT] G  O  O  D     L  U  C  K  !
  7     J  A  N  1  ,  1  9  9  0  ·  ·  ·  ·  ·  ·  ·  ·  ·  ·
```

A HAPPY NEW YEAR!

THANK YOU
FOR YOUR
KINDNESS.

GOOD LUCK!

JAN 1, 1990

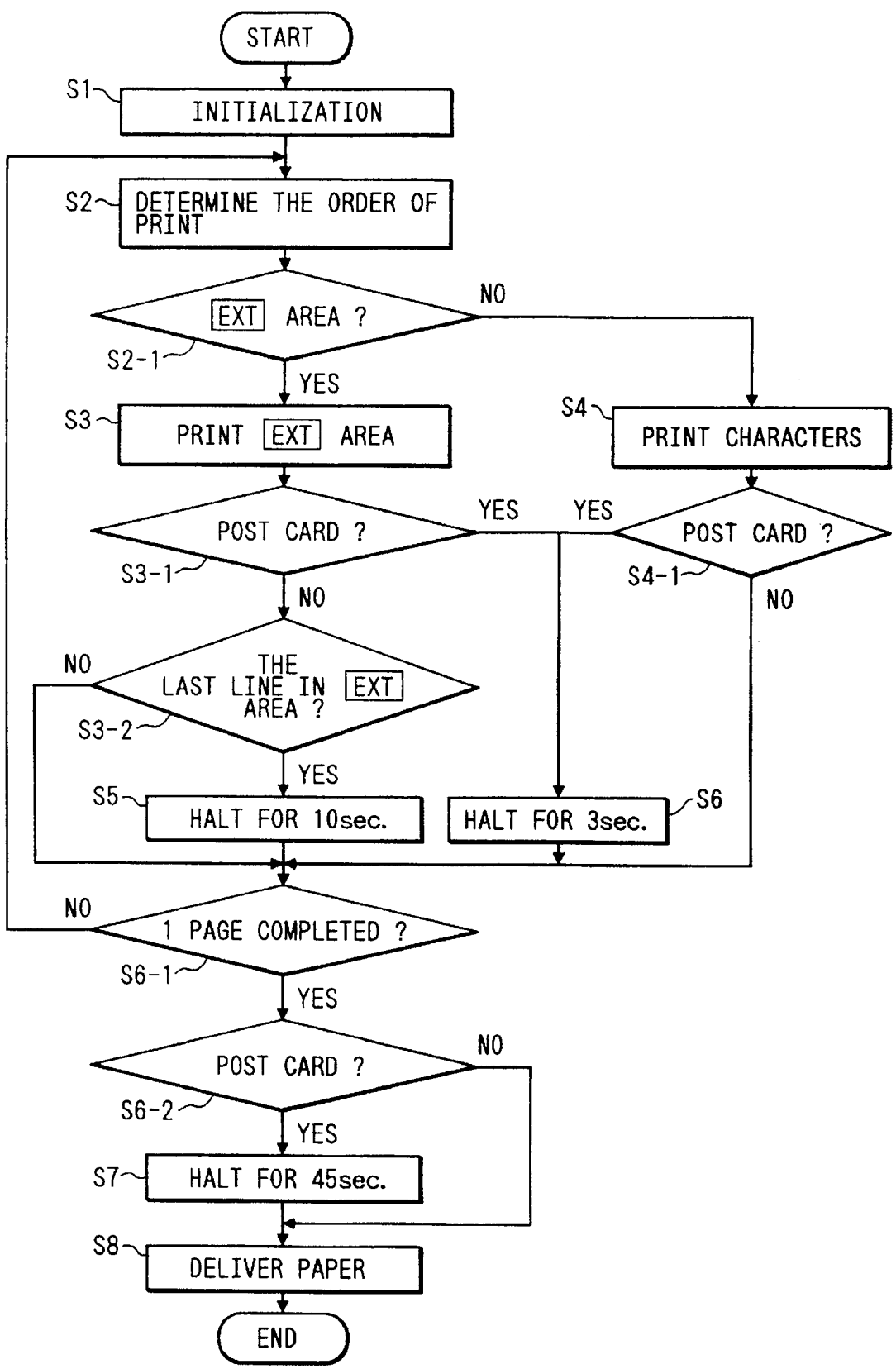

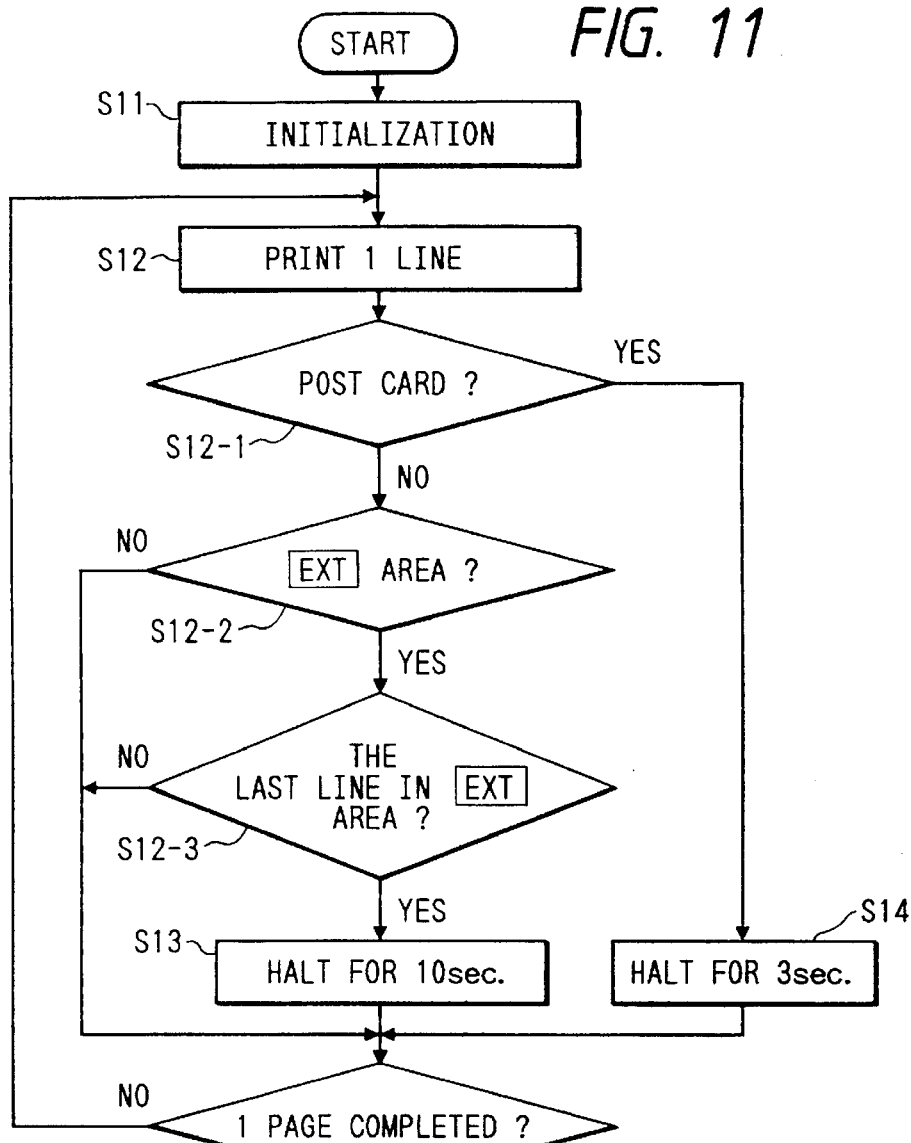
FIG. 11
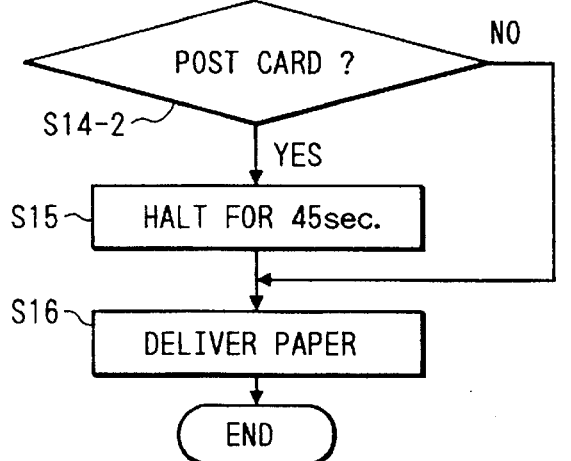
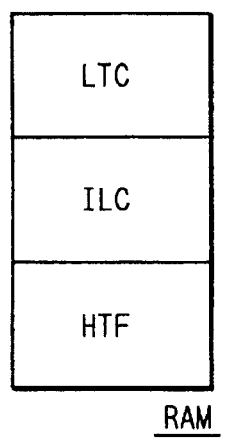
FIG. 12

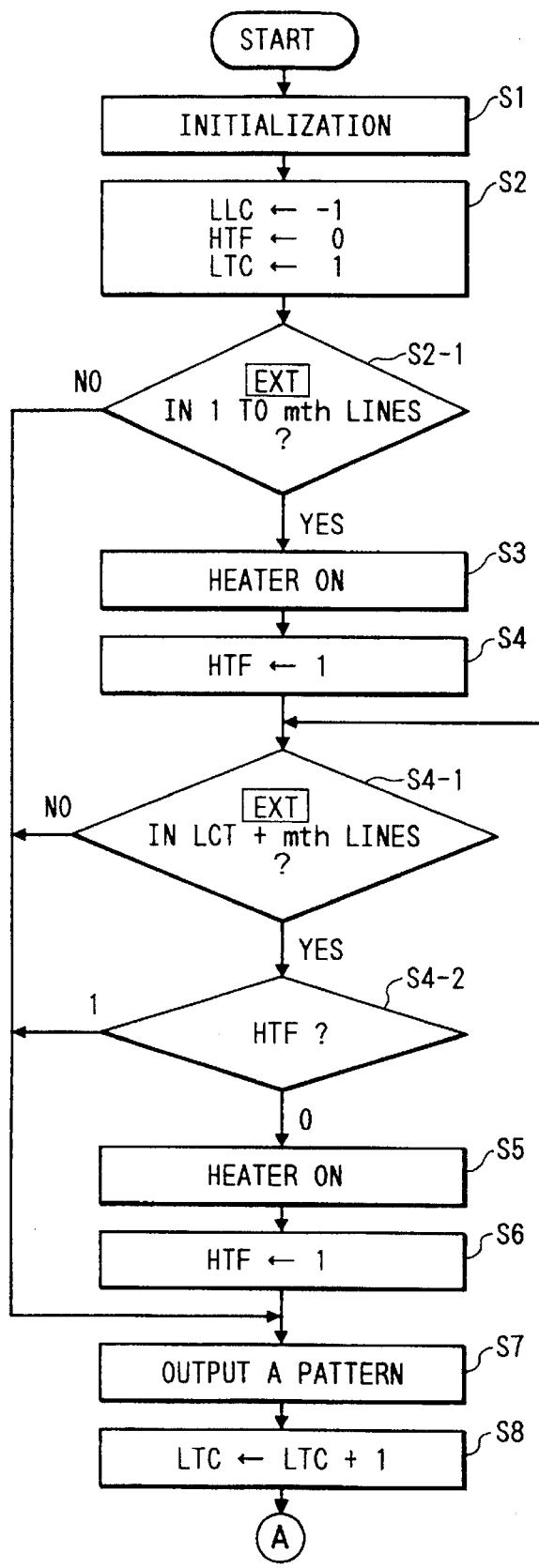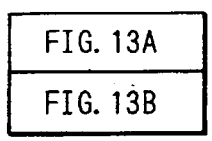

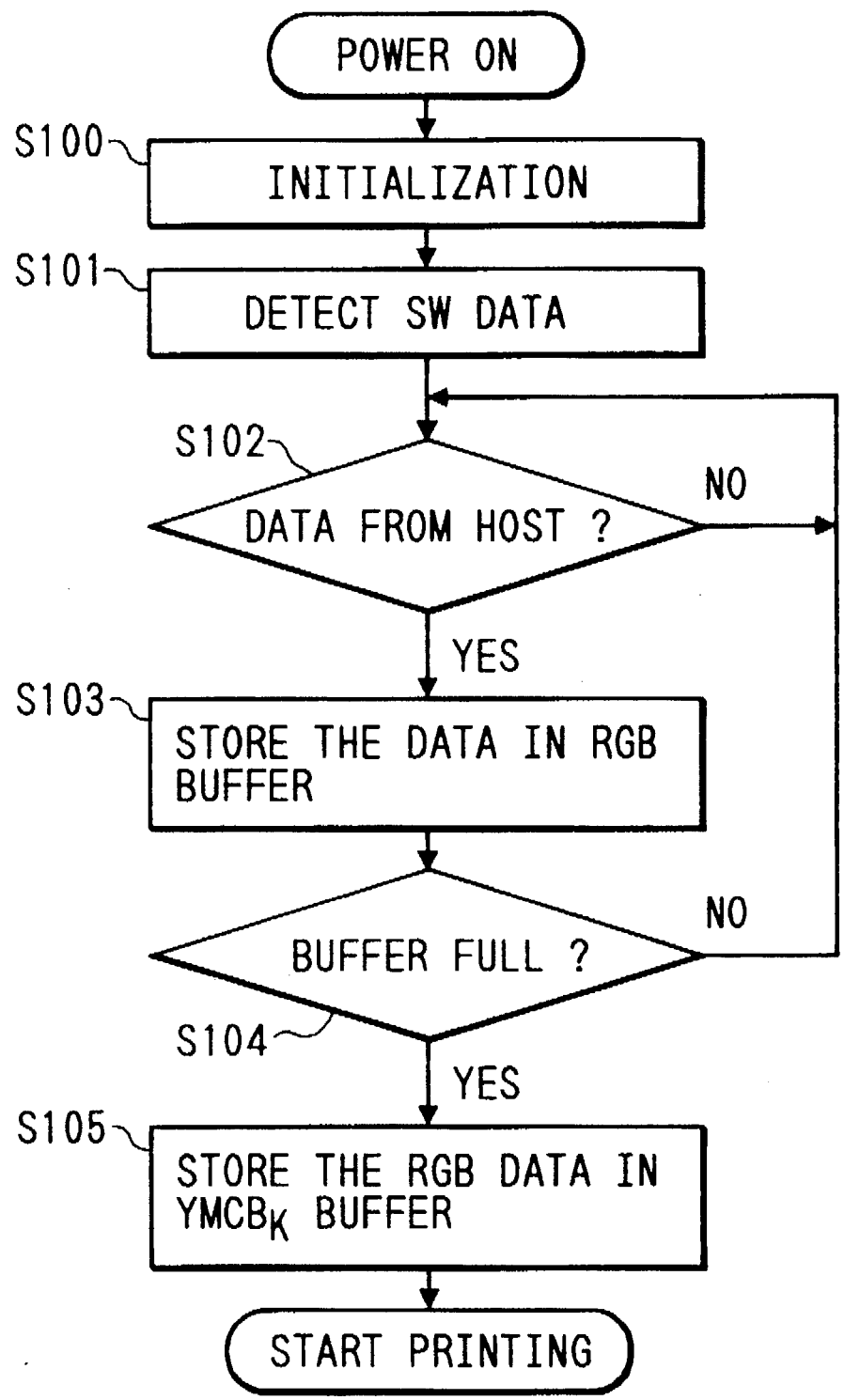

| COLOR | INPUT | | | OUTPUT | | | |
|---|---|---|---|---|---|---|---|
| | B | G | R | Y | M | C | $B_k$ |
| $B_k$ | 0 | 0 | 0 | 0 | 0 | 0 | 1 |
| R | 0 | 0 | 1 | 1 | 1 | 0 | 0 |
| G | 0 | 1 | 0 | 1 | 0 | 1 | 0 |
| Y | 0 | 1 | 1 | 1 | 0 | 0 | 0 |
| B | 1 | 0 | 0 | 0 | 1 | 1 | 0 |
| M | 1 | 0 | 1 | 0 | 1 | 0 | 0 |
| C | 1 | 1 | 0 | 0 | 0 | 1 | 0 |
| W | 1 | 1 | 1 | 0 | 0 | 0 | 0 |

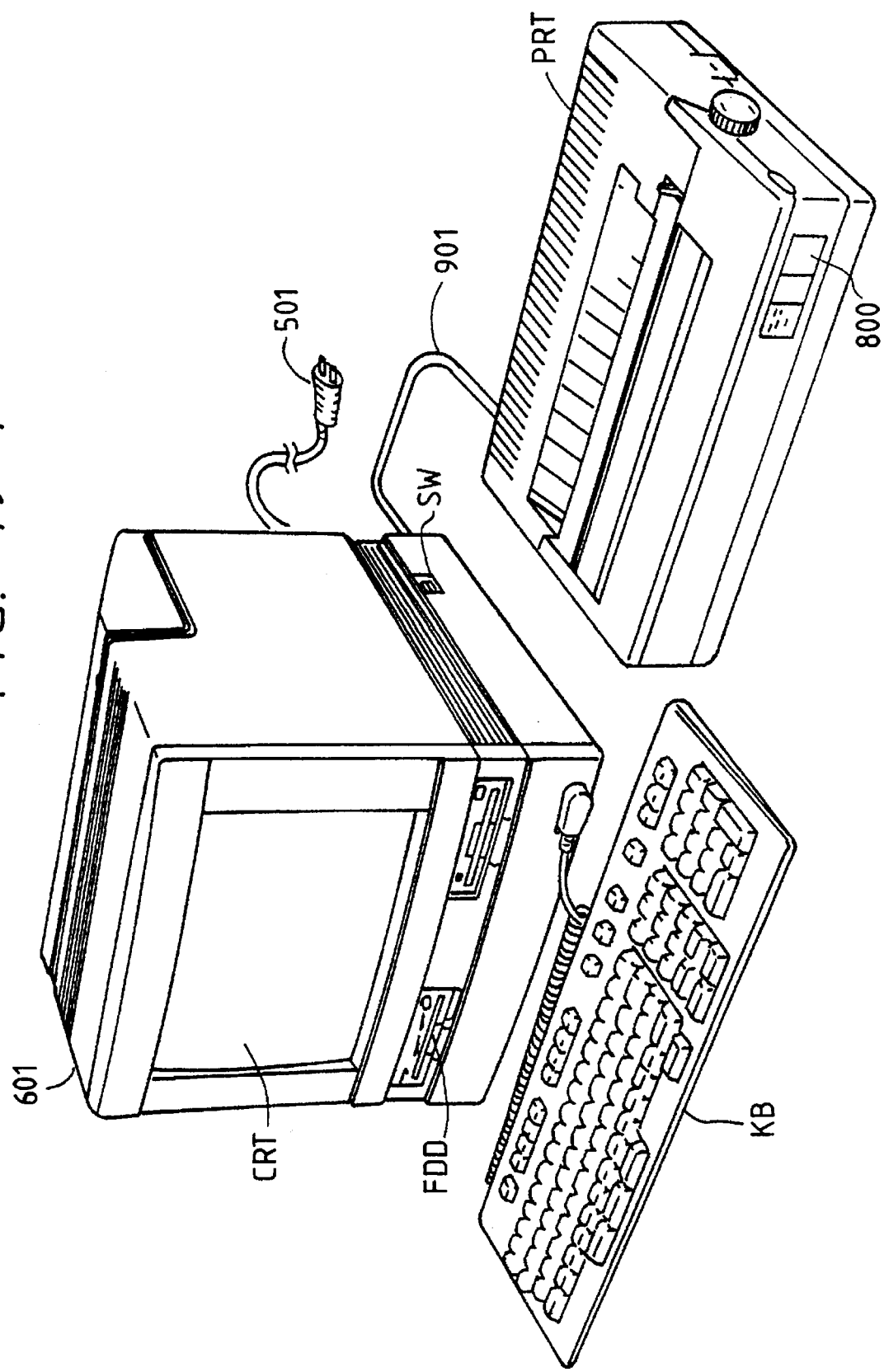

DOCUMENT PROCESSING APPARATUS FOR CONTROLLING FIXATION OF RECORDED INK

This application is a continuation of application Ser. No. 07/860,287 filed on Mar. 18, 1992, now abandoned, which is a continuation of application Ser. No. 07/540,695 filed Jun. 20, 1990, abandoned.

BACKGROUND OF THE INVENTION

1. Field of the Invention

The present invention relates to a document processing apparatus which can output document information.

2. Related Background Art

As an apparatus for outputting document information, an ink-jet recording apparatus is known. The ink-jet recording apparatus has many advantages, e.g., low noise during recording, capability of high-density recording, and the like, and has received a great deal of attention in recent years.

Although the ink-jet recording apparatus can use standard paper as a recording medium, it may pose a problem as to a fixing property depending on the kinds of standard paper used. More specifically, since the ink-jet recording apparatus employs an ink (liquid) as a recording agent, if a recording medium has a poor ink absorption property, the ink cannot be quickly soaked in the recording medium, and non-absorbed ink remains on the recording medium as a liquid.

When such a state occurs, a conveying member such as a roller is contaminated with the ink, and the ink contaminating the conveying member is transferred onto the surface of the next recording medium, thus considerably impairing recording quality. Furthermore, when an operator handles recorded recording media, not only his or her hand is stained, but also the ink is smeared by rubbing, thus degrading image quality.

When recorded recording media are stacked on, e.g., a tray, the same problem is posed since the recording media are rubbed on the tray.

As a method of preventing the problem and improving a fixing property of the ink to a recording medium, the recording medium is heated by a heater to accelerate evaporation of an aqueous component contained in an ink, so that the ink on the recording medium is quickly dried and solidified. In order to meet the demand for shortening a recording medium convey path length and preventing a conveying member from being contaminated, a fixing heater is arranged near a recording position of a recording head, e.g., on a platen, opposing the recording head, for regulating the recording medium to be flat.

A wordprocessor often performs a print operation which requires a long signal processing time, e.g., modified character or illustration printing, rotation printing, or the like. In this case, a sufficient time can be assured for fixing. Contrary to this, in a normal print mode, a time for fixing is often insufficient. When an ink is to be sufficiently fixed in the normal print mode, a specific portion of a paper sheet is excessively heated in the above-mentioned special print mode which requires a long time for signal processing, as described above, and the paper sheet is excessively dried and shrunk, so that troubles, e.g., offset of ruled lines, may occur. When both a pattern which requires a long processing time and a pattern which does not require a long processing time are present at the same time, a countermeasure for such situation is never considered.

In a document processing apparatus which comprises a conventional ink-jet recording apparatus, since various paper sheets having, e.g., different ink fixing properties are heated by a heater at the same temperature, when, e.g., a high-density pattern such as a graph, an image, or the like is printed in a high-temperature, high-humidity atmosphere, a fixing property is poor, and a non-fixed paper sheet may be fed after the print operation, thus contaminating paper sheets.

When an ink-jet recording apparatus is used as an output device of a computer, a work station, and the like, since these host apparatuses require only a short signal processing time for printing, it is demonstrated that a temperature of a contact surface between a recording medium and a fixing heater preferably falls within a range of 60° C. to 80° C. to perform satisfactory and quick fixing without curling a recording medium.

When the ink-jet recording apparatus is used as the output device of a wordprocessor, since a signal processing time required for printing normal characters (images whose patterns are prestored in a wordprocessor main body) can be very short, satisfactory fixing processing can be performed even if a temperature of a contact surface between the recording medium and the fixing heater falls within a range of 60° C. to 80° C. However, signal processing for printing specific images whose patterns are not prestored in the wordprocessor main body, e.g., modified characters, illustrations, rotation printing, and the like requires a long period of time.

In this case, a recording medium stands still on the fixing heater for a long period of time, and a portion, heated by the heater, of a recording medium which absorbs a moisture in a high-humidity atmosphere is dried and shrunk. As a result, ruled lines are offset, and a sheet surface is locally roughened or curled. In the worst case, the curled portion is brought into contact with an ink-jet head, so that the surface of the recording medium is contaminated with ink, or the head is damaged.

SUMMARY OF THE INVENTION

The present invention has been made in consideration of the above situation, and has as its object to provide a document processing apparatus which calculates a time required for generating pattern data to be printed, and halts output of the pattern data for a given period of time according to the calculated time, so that an ink can be sufficiently fixed in any atmosphere and paper sheets are free from contamination.

It is another object of the present invention to eliminate the conventional drawbacks, and to provide a document processing apparatus which calculates a time necessary for generating pattern data to be printed, and changes a temperature of a fixing heater according to the calculated time, so that paper sheets are free from contamination in any atmosphere.

It is still another object of the present invention to eliminate the conventional drawbacks, and to provide a document processing apparatus which can eliminate drawbacks upon printing even when a pattern requiring a long processing time and a pattern requiring a short processing time are present at the same time.

In consideration of the above situation, it is still another object of the present invention to provide a document processing apparatus comprising convey means for conveying a recording medium, output means for outputting pattern data to the recording medium conveyed by the convey means, generating means for generating the pattern data to be output, calculating means for calculating a time required for generating the pattern data by the generating means, and stay control means for controlling the convey means on the basis of the generation time calculated by the calculating means to change a stay time of the recording medium.

In consideration of the above situation, it is still another object of the present invention to provide a document processing apparatus comprising output means, having a heater unit, for outputting pattern data, generating means for generating a pattern to be output, processing time calculating means for calculating a time of the pattern generated by the generating means, and heater control means for controlling the heater unit on the basis of the generation time calculated by the processing time calculating means.

In consideration of the above situation, it is still another object of the present invention to provide a document processing apparatus comprising a serial type output means, having a head unit, for serially outputting pattern data, discrimination means for discriminating a type of pattern data, and head control means for controlling movement of the head unit in a serial output direction upon completion of output operations of different types of pattern data present in the same line.

In consideration of the above situation, it is still another object of the present invention to provide a document processing apparatus comprising storage means for storing data to be output, discrimination means for discriminating based on the data stored in the storage means whether or not pattern data requiring a long processing time is present, output means, having a heater unit, for outputting pattern data, and heater control means for, when the discrimination means determines the pattern data requiring the long processing time is present, controlling the heater unit before the output means outputs the pattern data.

It is still another object of the present invention to provide a document processing apparatus which can perform very fine fixing processing since it performs fixing operation of an image formed on a recording medium according to a thickness of a recording medium or a difference between processing times of images to be recorded, i.e., performs a combination of control of a convey speed of a recording medium and a control of a temperature of a contact surface between the recording medium and a fixing means.

It is still another object of the present invention to eliminate the conventional drawbacks, and to provide an ink-jet recording apparatus which can satisfactorily perform fixing regardless of the kinds of images to be recorded, e.g., images whose patterns may or may not be prestored in a wordprocessor main body, in other words, regardless of a stay time on a fixing heater.

A wordprocessor frequently performs recording on a relatively thick recording medium such as a post card as well as recording on a standard paper sheet. It is therefore still another object of the present invention to provide an ink-jet recording apparatus which can satisfactorily perform fixing even if such a relatively thick recording medium is used as well as a standard paper sheet.

It is still another object of the present invention to provide an ink-jet recording apparatus which can perform satisfactory fixing processing by controlling both a fixing temperature and a stay time of a recording medium in systematical consideration of various conditions such as a type of image to be recorded, a thickness of a recording medium, a print density, and the like.

It is still another object of the present invention to provide an ink-jet recording apparatus which can save power consumption by appropriately turning on/off a fixing heater.

It is still another object of the present invention to provide a document processing apparatus which can perform satisfactory fixing processing by independently or systematically adjusting a temperature of a contact surface between a recording medium and a fixing means or a stay or halt time on the fixing means in accordance with a thickness of a recording medium or a processing time of an image to be recorded.

The present inventors have made extensive studies to achieve the above objects, and found that since an image processing time considerably varies depending on types of images to be recorded, e.g., whether or not an image processing apparatus main body has a pattern, a convey time and a fixing temperature of a recording medium are controlled in consideration of the processing time, thus attaining satisfactory fixing processing.

The present inventors also found that although a degree of fixing differs depending on not only the types of image to be recorded but also a thickness of a recording member, both a convey time and fixing time of a recording medium are controlled, thus allowing satisfactory fixing processing.

According to the present invention, there is provided an ink-jet recording apparatus which comprises a recording head having an ejection port for ejecting ink, convey means for conveying a recording medium through a predetermined gap along a region opposing the ejection port of the recording head, and fixing means, arranged in the region opposing the ejection port, for accelerating fixing of an image formed on the recording medium by the ink ejected from the ejection port, comprising means for controlling a stay time of the recording medium on the fixing means and a temperature of a contact surface between the fixing means and the recording medium according to a type of the image.

According to the present invention, there is also provided an ink-jet recording apparatus which comprises a recording head having an ejection port for ejecting an ink, convey means for conveying a recording medium through a predetermined gap along a region opposing the ejection port of the recording head, and fixing means, arranged in the region opposing the ejection port, for accelerating fixing of an image formed on the recording medium by the ink ejected from the ejection port, comprising means for controlling a stay time of the recording medium on the fixing means and a temperature of a contact surface between the fixing means and the recording medium according to a thickness of the recording medium.

The present inventors have made extensive studies to achieve the above objects, and found that a fixing state varies depending on various conditions, e.g., a type of image to be recorded, a thickness of a recording medium, a print density, and the like, and a convey time and a fixing temperature of the recording medium are systematically or independently controlled according to these conditions to achieve a very good fixing operation. The present invention is thus made.

According to the present invention, there is provided an ink-jet recording apparatus which comprises a recording head having an ejection port for ejecting an ink, convey means for conveying a recording medium through a predetermined gap along a region opposing the ejection port of the recording head, and fixing means, arranged in the region opposing the ejection port, for accelerating fixing of an image formed on the recording medium by the ink ejected from the ejection port, comprising means for switching an ON/OFF state of a power source of the fixing means in accordance with a thickness of the recording medium.

Alternatively, the apparatus comprises means for switching an ON/OFF state of a power source of the fixing means in accordance with the type of image.

Furthermore, the apparatus comprises means for controlling an ON/OFF state of a power source of the fixing means and a stay time of the recording medium on the fixing means according to the thickness of the recording medium.

Moreover, the apparatus comprises means for controlling an ON/OFF state of a power source of the fixing means and a stay time of the recording medium on the fixing means according to the type of image.

In addition, the apparatus comprises means for controlling an ON/OFF state of a power source of the fixing means and a stay time of the recording medium on the fixing means according to the thickness of the recording medium and the type of image.

BRIEF DESCRIPTION OF THE DRAWINGS

FIGS. 4-1 and 4-2 are flow charts showing a control means according to the embodiment of the present invention;

FIG. 9 is a flow chart showing still another control means according to the embodiment of the present invention;

FIG. 11 is a flow chart showing still another control means according to the embodiment of the present invention;

FIG. 12 is a block diagram showing a content of a RAM shown in FIG. 2;

FIGS. 13, 13A and 13B are a flow charts showing still another control means according to the embodiment of the present invention;

FIGS. 15A and 15B are flow charts showing still another control means according to the embodiment of the present invention;

FIGS. 18-1 to 18-4 are block diagrams showing an arrangement according to another embodiment of the present invention;

FIG. 19-1 is a perspective view showing an outer appearance of the embodiment shown in FIGS. 18-1 to 18-4;

FIG. 19-2 is a perspective view showing an outer appearance of a printer of the embodiment shown in FIGS. 18-1 to 18-4; and FIG. 19-3 is a view for explaining an operation panel.

DETAILED DESCRIPTION OF THE PREFERRED EMBODIMENTS

Preferred embodiments of the present invention will be described in detail below with reference to the accompanying drawings. This embodiment aims at stabilizing fixing of an ink onto a recording medium, and controls a transfer start time from a wordprocessor (WP) controller as a host apparatus to a recording apparatus. Thus, a recording time interval can be varied in units of lines, and fixing of an ink can be improved. Alternatively, an ON/OFF state or a temperature of a heater is controlled, thereby improving fixing of an ink.

Furthermore, fixing of an ink is improved by controlling a combination of a time and a temperature.

From another viewpoint, fixing of an ink is improved according to various conditions by controlling a combination of a type of data to be recorded and the time, or a combination of the type of data and the temperature, or a combination of all of them.

In this embodiment, an expression "to halt an operation for t sec" means interruption of a print operation in a phenomenon, and also implies that image data transfer from the wordprocessor controller is postponed. That is, the above expression also implies that after an image is developed in the wordprocessor controller, data is transferred to a printer after the lapse of t sec, thereby controlling a print operation. The wordprocessor controller and the recording apparatus can be integrated or can exchange data through a versatile interface by communications as a host apparatus and a printer. In this embodiment, an "extended" area is represented by data such as an image, a solid black area, and the like, which require a long development time. Such data is a typical example of data having a high recording dot density per unit area, and requires a long period of time for fixing an ink. A post card is an example of a thick paper sheet, and requires a long period of time for fixing an ink. ON/OFF control of a heater is included in low-temperature/high-temperature control.

[Schematic Longitudinal Section]

Figure 1:
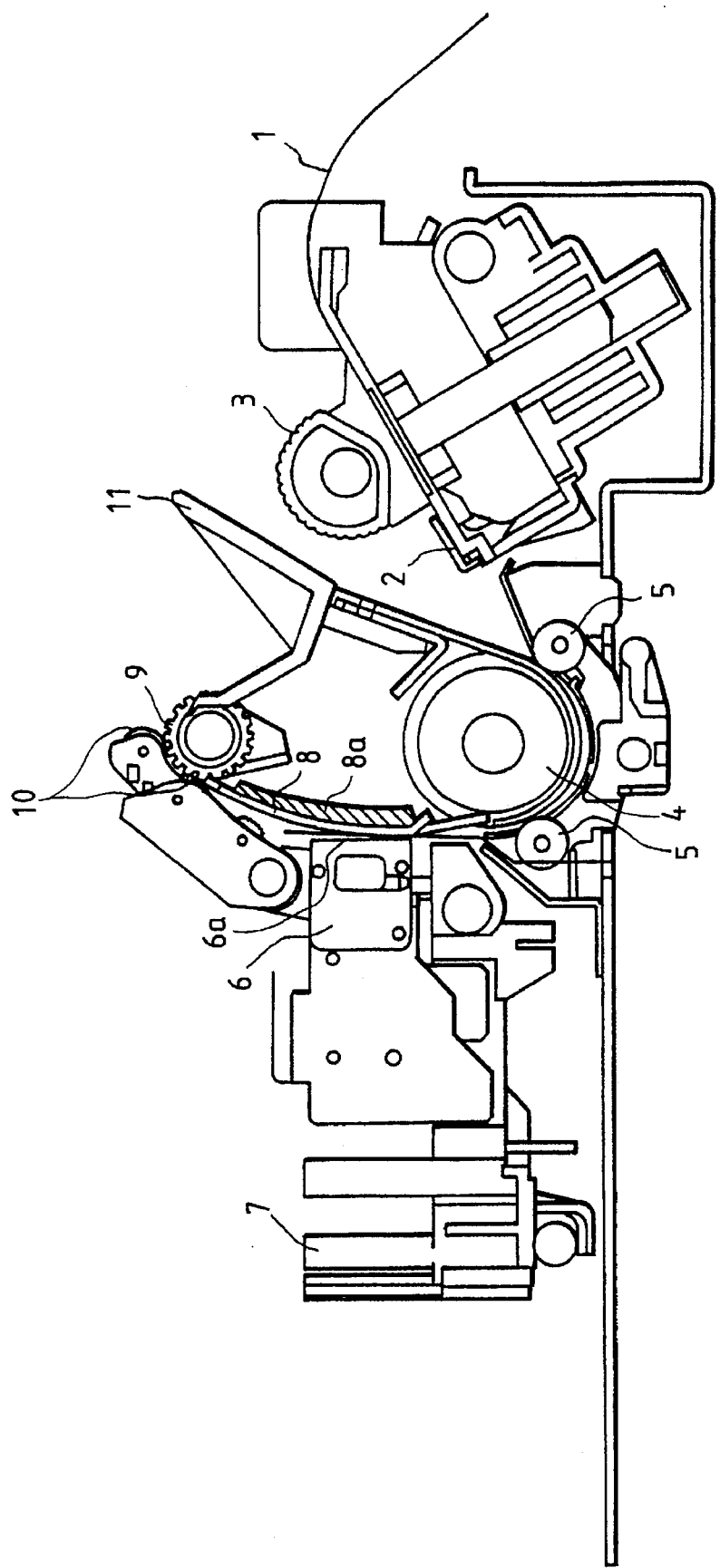
FIG. 1 is a schematic view showing an ink-jet printer according to an embodiment of the present invention.

FIG. 1 is a schematic longitudinal sectional view of an ink-jet printer used in this embodiment.

A cut sheet 1 as a recording medium is separated by a separation pawl 2 and is fed by a feed roller 3.

Thereafter, the recording medium 1 is clamped between a friction roller 4 and a pinch roller 5 urged against the friction roller 4, and is conveyed to a predetermined position.

An ink-jet head 6 is mounted on a carrier 7. The carrier 7 is movable in a subscanning direction. Ink ejection openings (not shown) are vertically aligned on a portion 6a of the head 6. When the head 6 is moved from one end to the other end (widthwise direction) of the recording medium 1 and the recording medium is conveyed by the friction roller 4, an image or characters can be printed on the entire recording medium 1. A fixing unit 8 comprises a heater 8a which is mounted on a lower surface of the fixing unit, and whose temperature can be controlled. The fixing unit 8 accelerates drying of an ink ejected onto the recording medium 1. The printed recording medium 1 is delivered by a deliver roller 9 and a spur gear 30 urged against the deliver roller 9.

[Arrangement of Ink Ejection Means]

The recording apparatus employs an aero-jet type ink ejection means for ejecting an ink using an air flow, or a bubble-jet type ink ejection means (which preferably has an electro-thermal conversion element as a component) which causes changes in state of a liquid including immediate formation and shrinkage of bubbles by heat energy, and ejects the liquid as liquid droplets according to formation of the bubbles, as described in U.S. Pat. Nos. 4,723,129 and 4,459,600. Although not shown, the above-mentioned means is equivalent to a dot recording means which comprises a plurality of ejection openings communicating with a liquid path, and a plurality of heat energy generating means arranged at positions for locally applying heat energy to a liquid in the liquid path. The ejection openings and the heat energy generating means may have a one-to-one correspondence, or one ejection opening may have a plurality of heat energy generating means. However, the present invention is not limited to this.

The recording apparatus of this embodiment comprises a serial type printer in which a recording head is moved but may comprise a line printer having a head having a width corresponding to one line.

[Circuit Arrangement]

Figure 2:
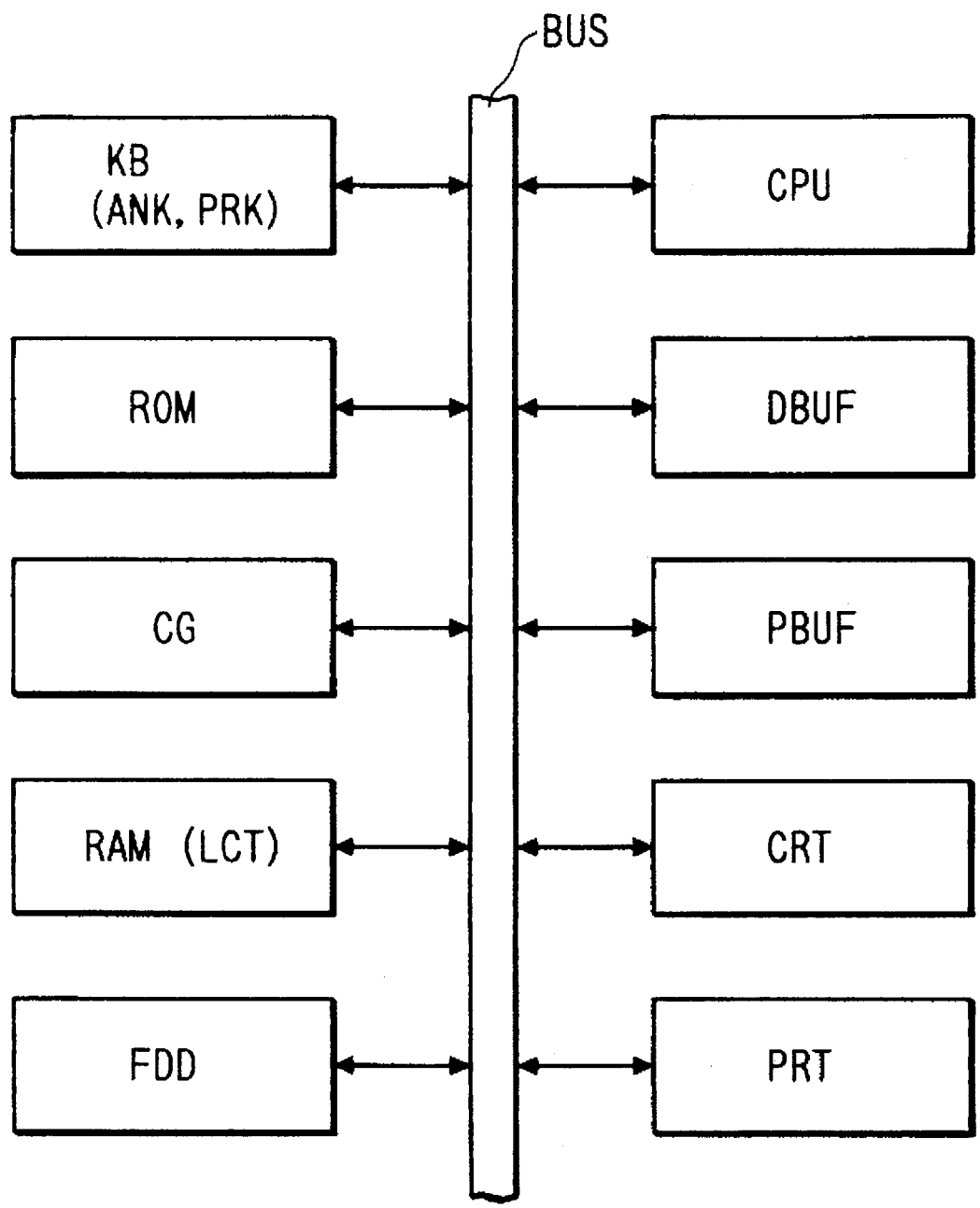
FIG. 2 is a block diagram showing a circuit arrangement according to the embodiment of the present invention.

FIG. 2 shows a circuit arrangement of the entire system according to the embodiment of the present invention. In FIG. 2, a keyboard KB includes alphanumeric keys ANK, a print start key PRK, and the like.

A microprocessor CPU performs arithmetic and logic judgments for document processing, and controls components connected to a common bus BUS (to be described below).

The common bus BUS is used to instruct and control connected equipments, and to transfer data. A read-only memory ROM prestores a control means used by the microprocessor CPU, as will be described in detail later with reference to FIG. 4 and subsequent drawings.

A document memory DBUF has a code information area for storing character strings input from the keyboard KB.

A print buffer PBUF is a memory for storing dot pattern data to be output to an ink-jet printer PRT, control commands, and the like.

A display CRT utilizes a cathode-ray tube, or the like. A floppy disk drive FDD reads or writes information from or in a floppy disk FD storing document information, image information, and the like.

A character generator CG generates character patterns in a font format on the basis of character code information, e.g., when characters are output to the ink-jet printer PRT.

A random access memory RAM comprises a print line counter LCT, and the like.

[Print Result]

Figures 3A, 3B:
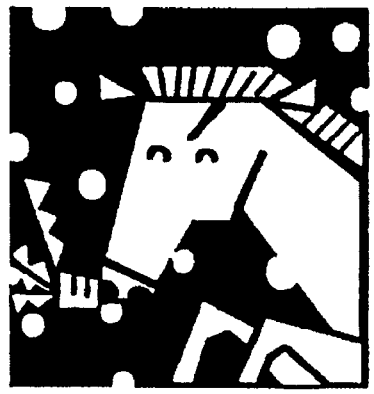
FIGS. 3A and 3B are respectively a view showing a state of a document memory DBUF and a view for explaining an output result in the embodiment of the present invention.

FIGS. 3A and 3B show a state of the document memory DBUF and its print result.

FIG. 3A shows the state of the document memory DBUF in this embodiment. In this embodiment, the number of characters per line is 20, and each character data in the document memory DBUF is expressed by a character code such as JIS C6226.

In FIG. 3A, a rectangle whose right and left sides are defined by symbols EXT, i.e., a rectangle having a diagonal line connecting a point (line 2, column 3) and a point (line 6, column 10), is an image area.

FIG. 3B shows a print result of a document shown in FIG. 3A by the ink-jet printer PRT. Image data read out from a floppy disk is printed in the image area in FIG. 3A.

(First Embodiment)

Fixing processing performed when images shown in FIGS. 3A and 3B, i.e., images having different image processing times depending on types of image are recorded using the above-mentioned apparatus will be described below.

(Halt Output When Processing Time is Short (Document Processing))

Figures 1, 4:
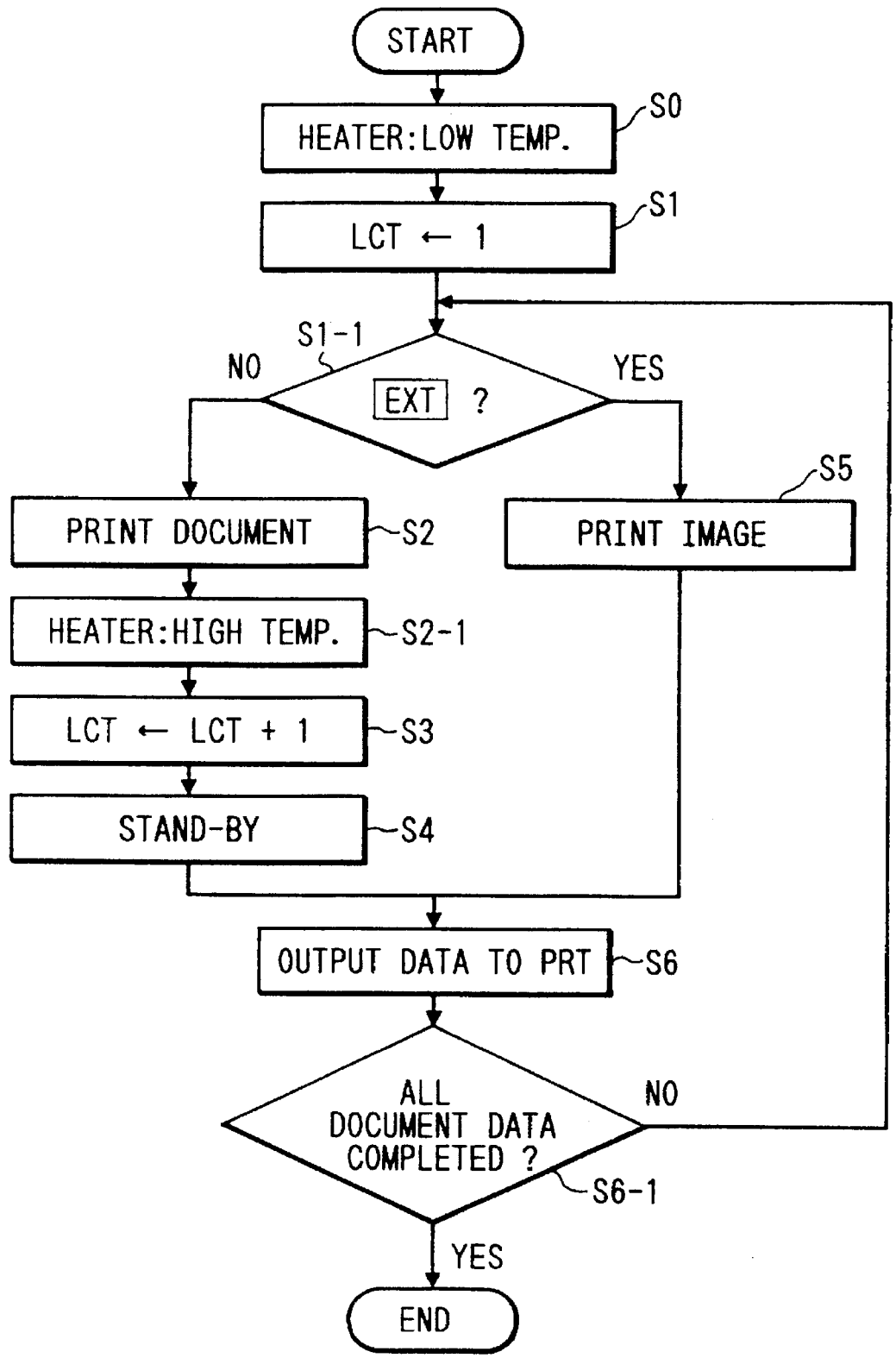
Figures 2, 4:
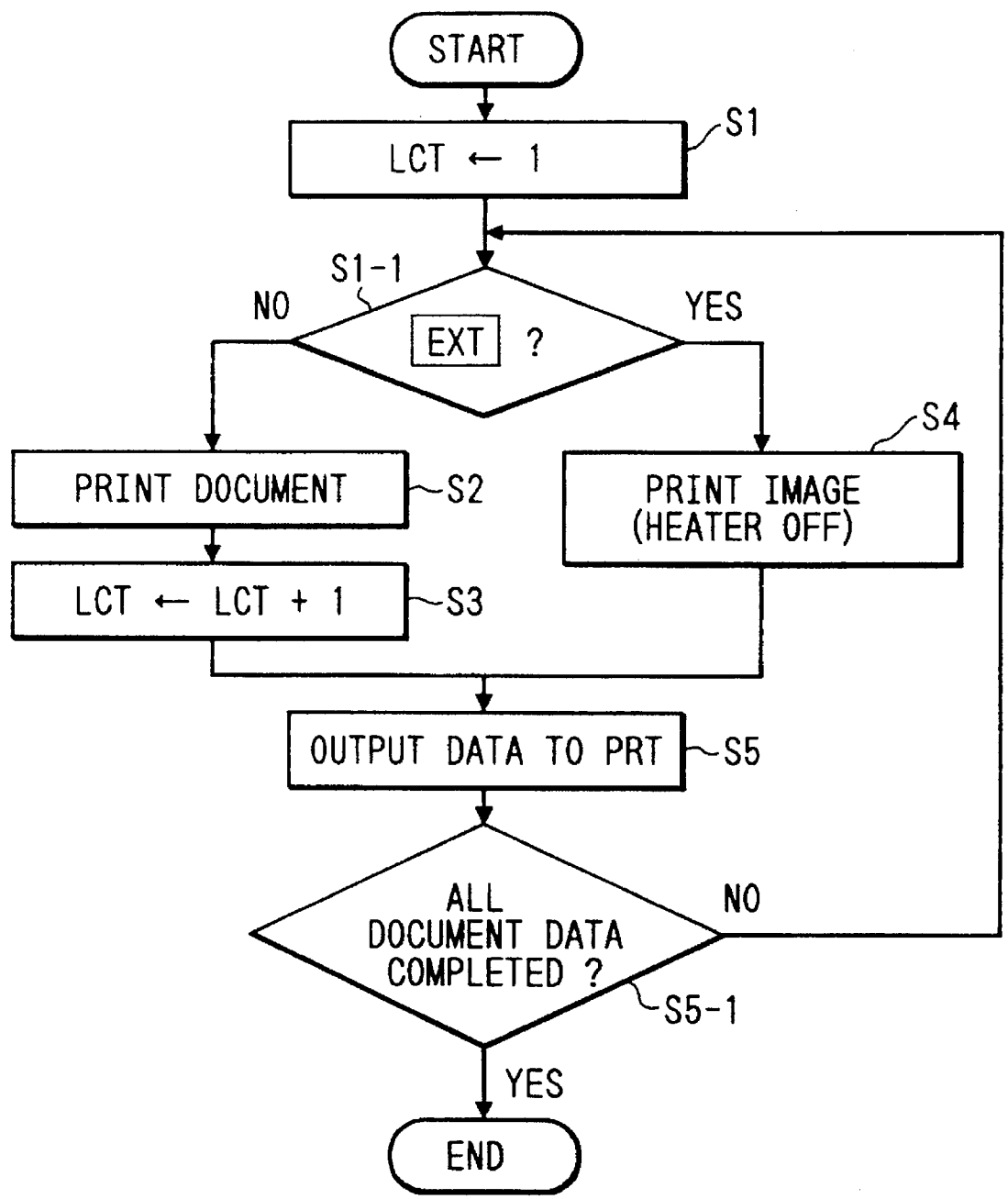

FIG. 4-1 is a main flow chart showing a control sequence executed by the microprocessor CPU when the print start key PRK is depressed. Assume that document data has already been stored in the document memory DBUF by another document edit processing, or the like, in FIG. 4-1.

In FIG. 4-1, a fixing heater of the apparatus main body is controlled so that a temperature of a contact surface between the heater and the recording medium is set to be a low temperature falling within the range of about 35° C. to 50° C. in step S0. In step S1, initialization processing is performed. For example, "1" is set in the print line counter LCT.

In decision step S1.1, character codes in the document memory DBUF corresponding to the print line counter LCT are checked. If it is determined in step S1.1 that a symbol EXT representing an image area is present, the flow advances to step S5 to execute image print processing; otherwise, the flow advances to step S2 to execute document print processing.

In the document print processing in step S2, pattern data, control commands, and the like in a format to be output to the ink-jet printer PRT are edited on the basis of document data of one line in the document memory DBUF corresponding to the print line counter LCT. Thereafter, in step S3, the print line counter LCT is incremented by one.

Since a time required for editing document pattern data is very short, processing is halted for a predetermined period of time (e.g., 5 sec) in standby processing in step S4 (including interruption of data transfer to the printer), thus improving a fixing property of an ink. In step S2.1, a fixing temperature is switched from a low temperature to a high temperature falling within the range of about 45° C. to 70° C., thus achieving satisfactory fixing processing. In addition, since the fixing temperature is set to be high, the HALT time can be shortened, thus improving a throughput. Note that temperature control in steps S0 and S2.1 need not be executed, as a matter of course.

In the image print processing in step S5, image data of one line corresponding to the print line counter LCT is loaded from the floppy disk FD, and pattern data, control commands, and the like in a format to be output to the ink-jet printer PRT are edited on the basis of the loaded data. Edit processing of image pattern data requires a relatively long processing time since it must access the floppy disk FD. For example, 3 to 4 sec are required to generate 10 enlarged characters on the basis of outline fonts, and about 14 sec are required to modify, e.g., to add shadow to the characters. In this manner, approximate time data corresponding to various processing operations are stored, and a processing time is calculated on the basis of edit commands. For this reason, no standby processing is required, and satisfactory fixing processing can be performed while the heater temperature is kept low.

In printer output processing in step S6, data generated by the document print processing in step S2 and the image print processing in step S5 are output to the ink-jet printer PRT.

It is checked in decision step S6.1 if all the document data in the document memory DBUF are printed. If YES in step S6.1, this routine is ended; otherwise, the flow returns to decision step S1.1.

(Another Embodiment)

In the first embodiment, edit processing of image pattern data is assumed to require a relatively long processing time. An edit time of pattern data to be output to the ink-jet printer may be actually calculated, and an output may be halted according to the calculated time.

For example, 3 to 4 sec are required to generate 10 enlarged characters on the basis of outline fonts, and about 14 sec are required to modify, e.g., to add shadow to the characters. In this manner, approximate time data corresponding to various processing operations are stored in a ROM, and a processing time can be calculated on the basis of edit commands. A stay time can be controlled according to whether or not the calculated time exceeds 10 sec.

In the above embodiment, whether a convey operation is halted or not is switched. However, a convey speed may be decreased according to a generation time. Such an operation can be accurately realized by controlling a pulse motor.

In this embodiment, a heater temperature is controlled to be a low temperature in an initial state, and is controlled to be a high temperature for data having a short image processing time. However, the present invention is not limited to this. For example, a temperature of the contact surface between the heater and the recording medium is set to be a high temperature falling within the range of about 45° C. to 70° C., and only when data having a long image processing time are input, the temperature of the contact surface can be set to be a low temperature falling within the range of about 35° C. to 50° C. More specifically, in the image print processing in step S5, a control command for decreasing the temperature of the fixing heater is issued to the ink-jet printer since image pattern data edit processing must access the floppy disk FD and requires a relatively long processing time. Upon reception of this command, the ink-jet printer controls the fixing heater to have a low temperature until the next pattern data to be printed is received, thus preventing a recording medium from being dried and shrunk.

The heater temperature need not always be controlled between two levels, i.e., high and low temperatures. For example, a temperature control table according to image processing times is prepared, and the temperature of the fixing heater may be finely controlled according to the table.

In the method of this embodiment, for a print pattern having a long processing time, the fixing heater is controlled to have a low temperature. This operation may be achieved by turning on/off the heater according to a processing time.

(Control Temperature When Processing Time is Long (Image Processing))

FIG. 4-2 is a main flow chart showing a control sequence executed by the microprocessor CPU when the print start key PRK is depressed. Assume that document data has already been stored in the document memory DBUF by another document edit processing, or the like, in FIG. 4-2.

In FIG. 4-2, initialization processing is executed in step S1. For example, "1" is set in the print line counter LCT.

In decision step S1.1, character codes in the document memory DBUF corresponding to the print line counter LCT are checked. If it is determined in step S1.1 that a symbol EXI representing an image area is present, the flow advances to step S4 to execute image print processing; otherwise, the flow advances to step S2 to execute document print processing.

In the document print processing in step S2, pattern data, control commands, and the like in a format to be output to the ink-jet printer PRT are edited on the basis of document data of one line in the document memory DBUF corresponding to the print line counter LCT. Thereafter, in step S3, the print line counter LCT is incremented by one.

In the image print processing S4, edit processing of image pattern data requires a relatively long processing time since it must access the floppy disk FD. For this reason, a control command for decreasing a temperature of the fixing heater is issued to the ink-jet printer. Upon reception of this command, the ink-jet printer turns off the fixing heater until pattern data to be printed is received, thus preventing a recording medium from being dried and shrunk.

Thereafter, image data of one line corresponding to the print line counter LCT is loaded from the floppy disk FD, and pattern data, control commands, and the like in a format to be output to the ink-jet printer PRT are edited on the basis of the loaded data.

In printer output processing in step S5, data generated by the document print processing in step S2 and the image print processing in step S4 are output to the ink-jet printer PRT.

It is checked in decision step S5.1 if all the document data in the document memory DBUF are printed. If YES in step S5.1, this routine is ended; otherwise, the flow returns to decision step S1.1.

(Another Embodiment)

In the method of this embodiment, edit processing of image pattern data is assumed to require a relatively long processing time. An edit time of pattern data to be output to the ink-jet printer may be actually calculated, and temperature control of the fixing heater may be performed according to the calculated time. This operation is the same as that described with reference to FIG. 4-1.

In the method of this embodiment, the fixing heater is turned off for a print pattern requiring a long processing time. For example, a temperature control table according to image processing times is prepared in the ROM, and the temperature of the fixing heater may be finely controlled according to the table. Low-/high-temperature control of the heater can be realized by changing an energization amount to the heater.

(Second Embodiment)

Figure 5:
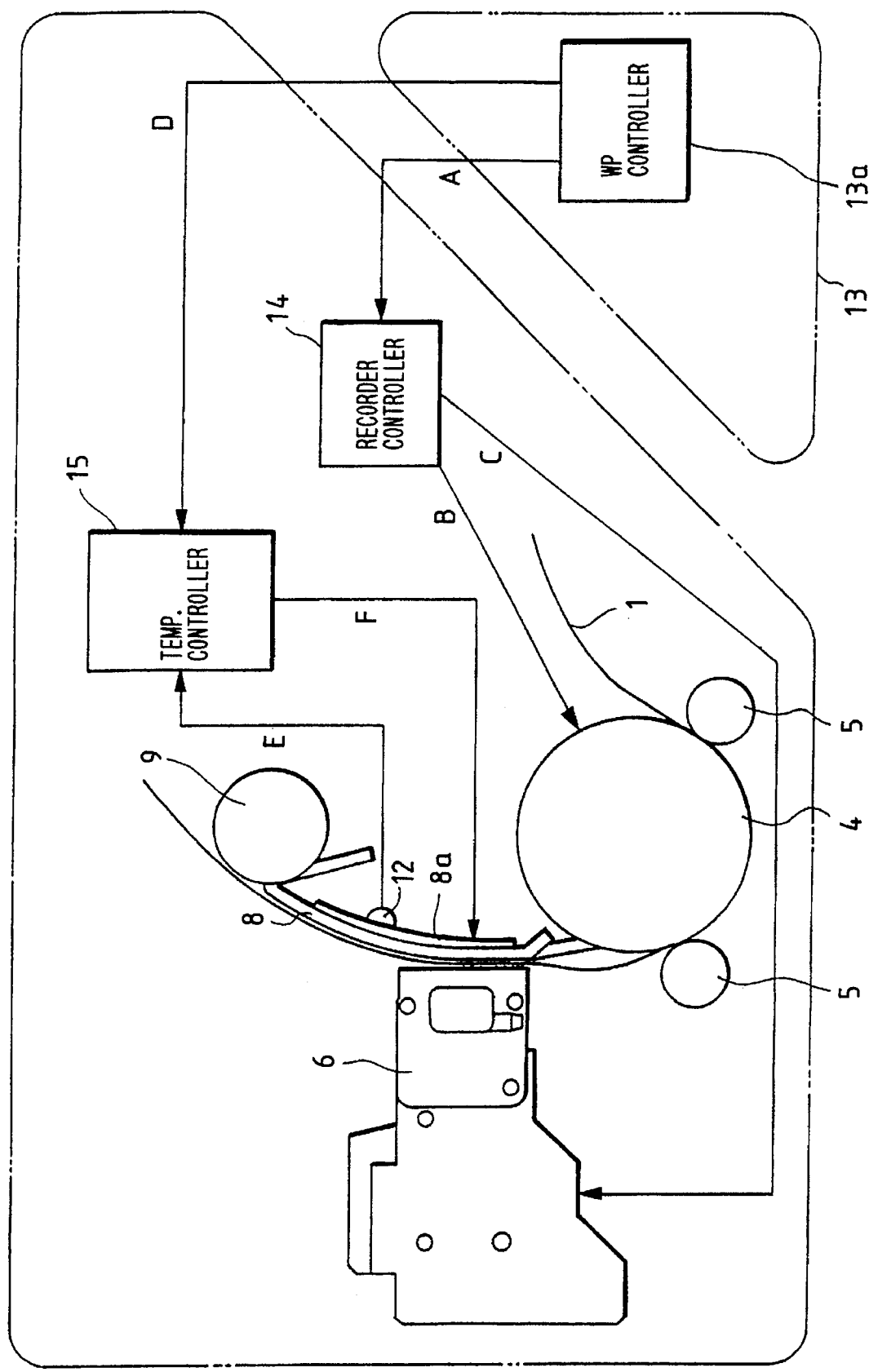
FIG. 5 is a schematic viewprinter comprising a printer comprising a temperature control means.

Fixing control according to a thickness or type of a recording medium to be used using the above-mentioned apparatus will be described below. For the sake of simplicity, a case will be described below wherein a standard paper sheet and a thick paper sheet are subjected to fixing processing. FIG. 5 is a schematic view showing an ink-jet printer used for fixing images on a standard paper sheet and a thick paper sheet.

Note that the standard paper sheet is a paper sheet having an area weight of less than 100 mg/m$^2$, and its surface may or may not be coated. The thick paper sheet is a paper sheet such as a post card having an area weight of 100 mg/m$^2$ or more.

A heater 8a heats a sheet metal portion of a fixing unit 8. Note that the heater 8a may be a sheet-like heater or may have any other shape, e.g., a planar or rod-like shape. The heater 8a may be arranged over the entire lower surface of the fixing unit 8, or may be partially arranged on predetermined portions. If the heater 8a need be divisionally controlled, only a necessary portion need be heated according to the size of a recording medium. A thermistor 12 detects the temperature of the fixing heater. An apparatus, e.g., a wordprocessor 13 serves as a host apparatus of the printer, and includes a controller 13a. A line A transmits a print content to a print operation controller of the printer, and a controller 14 drives a friction roller 4 through a line B and an ink-jet head 6 through a line C on the basis of the transmitted content.

The wordprocessor controller 13a sends information associated with a recording medium to the printer through a line D. In this embodiment, this information is selected by a user before or after a document is created. The information sent through the line D indicates only whether to perform a post card print operation. A controller 15 controls the temperature of the fixing heater. A power supply voltage supplied to the heater 8a through a line F is controlled on the basis of the sheet information from the line D and information from the thermistor 12 from a line E, so that the heater temperature is set to be low or high.

At the same time, the sheet information is supplied to the recorder controller 14 through the line A, and a stay time (halt time) of the recording medium on a fixing means is controlled according to the thickness of the recording medium to be used.

Figure 6:
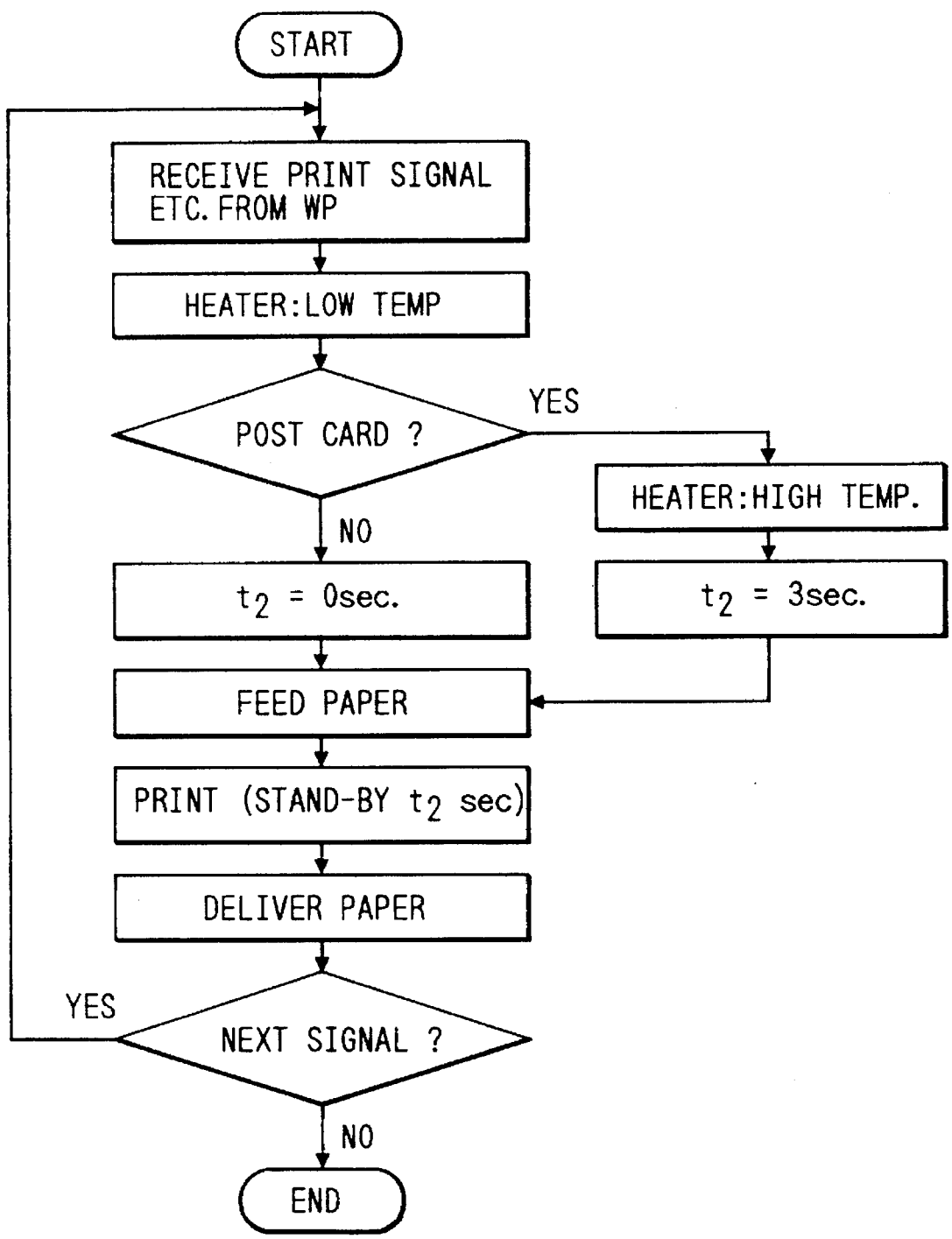
FIG. 6 is a flow chart showing another control means according to the embodiment of the present invention.

FIG. 6 is a flow chart showing fixing processing control of the fixing means in the ink-jet printer of this embodiment. (Flow Chart of Fixing Processing)

A user designates a thickness of a recording sheet to be used in the wordprocessor, and then creates a document. Thereafter, the user instructs the wordprocessor to issue a print command. In FIG. 6, the printer receives a print signal and sheet information from the wordprocessor. At this time, a temperature between contact surfaces of the fixing heater and the recording medium is controlled to be a low temperature. A parameter $t_2$ is set to be 3 sec or 0 sec on the basis of the received sheet information indicating whether or not the recording medium is post card. When the recording medium is a post card, the temperature of the contact surface is set to be a high temperature. Thereafter, a print operation is started via a paper feed operation. The parameter $t_2$ indicates a time for staying a recording sheet on the fixing heater for every line printing. Therefore, since $t_2=0$ for a standard paper sheet, no stay time of a recording sheet for every line printing is set, and print operations sequentially progress, thus completing the print operations soon. Since $t_2=3$ for a post card, a stay time of 3 sec each is set on the fixing heater for every line printing. In this manner, for a thick paper sheet, the temperature of the contact surface is set to be a high temperature, and a stay time is set, thus achieving satisfactory fixing processing. Note that the stay time may be considered as a timing for transferring a dot pattern to a recorder.

More satisfactory fixing processing can be performed if fixing temperature control and stay time control are performed as follows. The following control is particularly effective in view of the fact that fixing processing is sufficiently performed between a recording area to a roller used to deliver a paper sheet.

A description of this control will be made hereinafter. A user designates a paper size in the wordprocessor, and then creates a document. Thereafter, the user instructs the wordprocessor to issue a print command.

When the printer receives print data and sheet information from the wordprocessor, it determines a fixing temperature t° C. of the heater, and a halt time T1 sec for each line.

Assuming that an image can be fixed if a sheet is stayed for T sec within a distance L between a recorder and a spur roller when the temperature of the fixing heater is set at t° C., a combination of t° C. and T sec corresponding to certain paper type and thickness can be determined to have a predetermined range. When sheets of some types are heated at a high temperature, they are curled and are undesirably brought into contact with a head. In this case, the temperature is decreased, and a stay time T is increased. If T is set to be too large, it influences a throughput, and is not suitable for commercial products. In consideration of these conditions, t° C. and T sec are determined in advance according to paper thicknesses of paper sheets used in a print operation of the wordprocessor.

If one carriage return length is represented by l, a carriage return operation is performed L/l times until a paper sheet reaches the spur roller. Therefore, if a halt time $T_1$ sec is inserted for each carriage return operation, $T_1=T/(L/l)$. More specifically, if T is determined, then $T_1$ can be determined. For some types of sheet which had better not to be heated by the heater, the heater is turned off, and a fixing operation is controlled by only $T_1$. Alternatively, for some other types of sheet, $T_1=0$, and a fixing operation is controlled by only t° C.

When the two parameters t° C. and $T_1$ sec are determined on the basis of sheet information, the temperature of the fixing heater is controlled through the lines E and F, and a paper feed speed is controlled through the line B, so that a fixing operation can be completed until a paper sheet reaches the spur roller.

An ink density of a print result varies depending on contents and volumes of print data, and a time required for fixing also varies. Thus, paper feed control may be performed in such a manner that a halt time $T_1$ for each line is changed in units of lines to achieve a necessary stay time T, so that the time T can be attained for a certain print line until the line reaches the spur roller.

For example, if there is no print data after data of the last line is printed, a carriage return operation is successively performed. Therefore, a paper feed operation need not be halted after every L/l carriage return operations, but a paper sheet may be delivered at a time after the paper feed operation is halted for $T_1 \times L/l=T$ sec after a print operation.

This embodiment is not limited to halting of a paper feed operation but may be realized by a low-speed driving operation, as a matter of course.

The thickness of a recording medium can be designated at a host side to execute the above-mentioned control. Alternatively, a sheet thickness detector may be arranged in the printer to automatically execute the above-mentioned control.

For example, a sheet thickness sensor may be arranged in the printer to supply sheet thickness information to a controller through a signal line. The sensor may comprises a transmission type photosensor, and may be set to enable a sensor output upon detection of a thin sheet having a thickness of, e.g., about several tens of microns, and to disable the sensor output upon detection of a sheet having a thickness of 200 microns or more.

Alternatively, a change in moving amount of a pinch roller 75 which is urged against the friction roller 74 may be detected.

Figure 7:
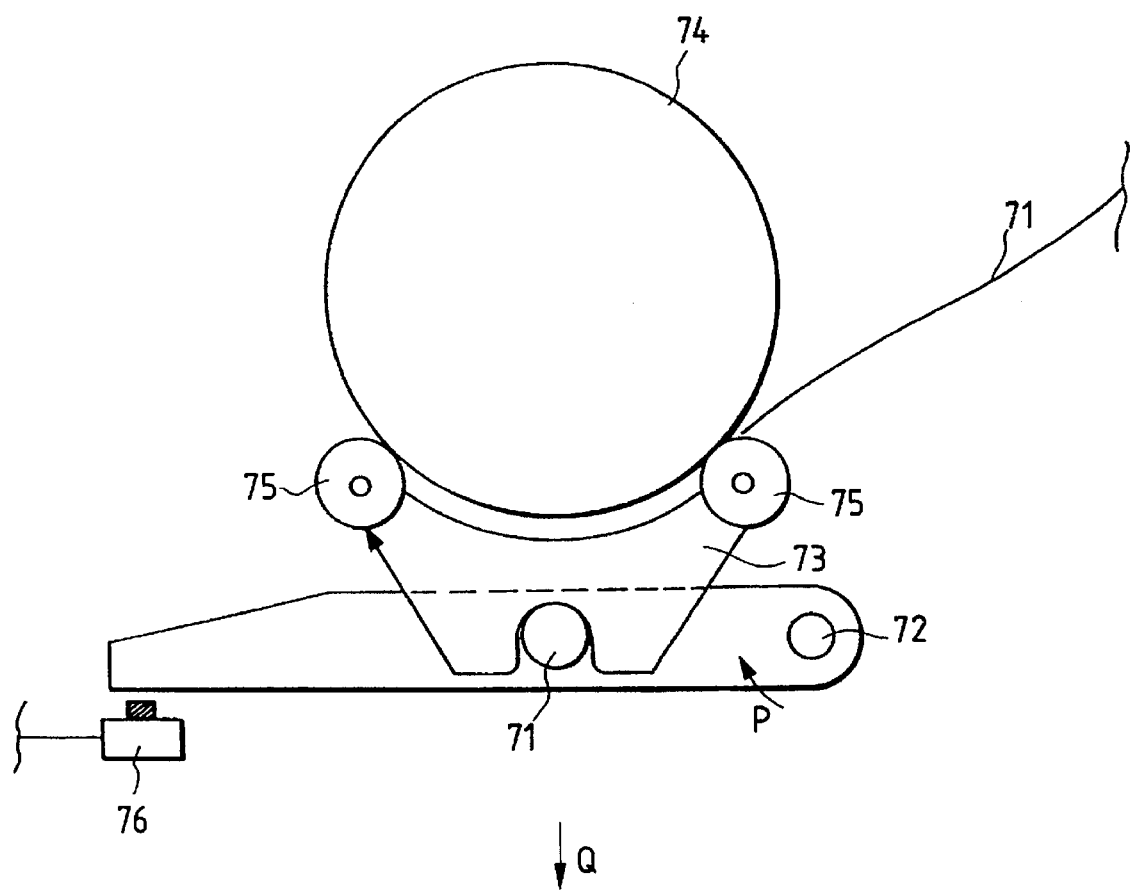
FIG. 7 is a schematic view showing a means for detecting a thickness of a recording member.

FIG. 7 shows this example. The printer includes the friction roller 74, and pinch rollers 75. A pinch roller base 71 is rotatable about a shaft 72, and is biased in a direction of an arrow P by a torsion coil spring (not shown). The biasing force is transmitted to the pinch rollers 75 via a pinch roller base 73.

Since the friction roller 74 is fixed in position, when the recording sheet 1 is thick, one pinch roller 75 is pushed downward in a direction of an arrow Q. This movement is transmitted to the pinch roller base 71 to turn on a switch 76.

In this manner, a sheet thickness can be automatically determined in the printer, and the parameters t° C. and T sec can be determined. Thus, a user need not input sheet thickness information from the wordprocessor.

(Third Embodiment: Control Performed When Both Image (Requiring Long Processing Time) Data and Character (Requiring Short Processing Time) are Mixed)

When data of two types requiring long and short image processing times are mixed on one recording medium, fixing processing is executed as follows.

Figures 8A, 8B:
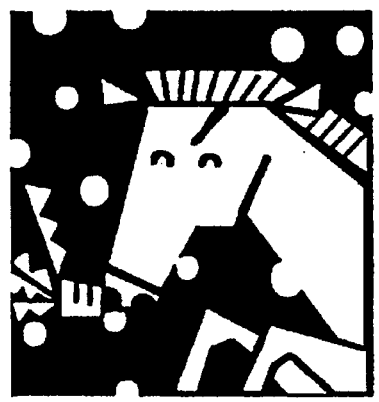
FIGS. 8A, 8B and 8C are respectively a view showing a state of the document memory DBUF and views for explaining other output results in the embodiment of the present invention.
Figure 8C:
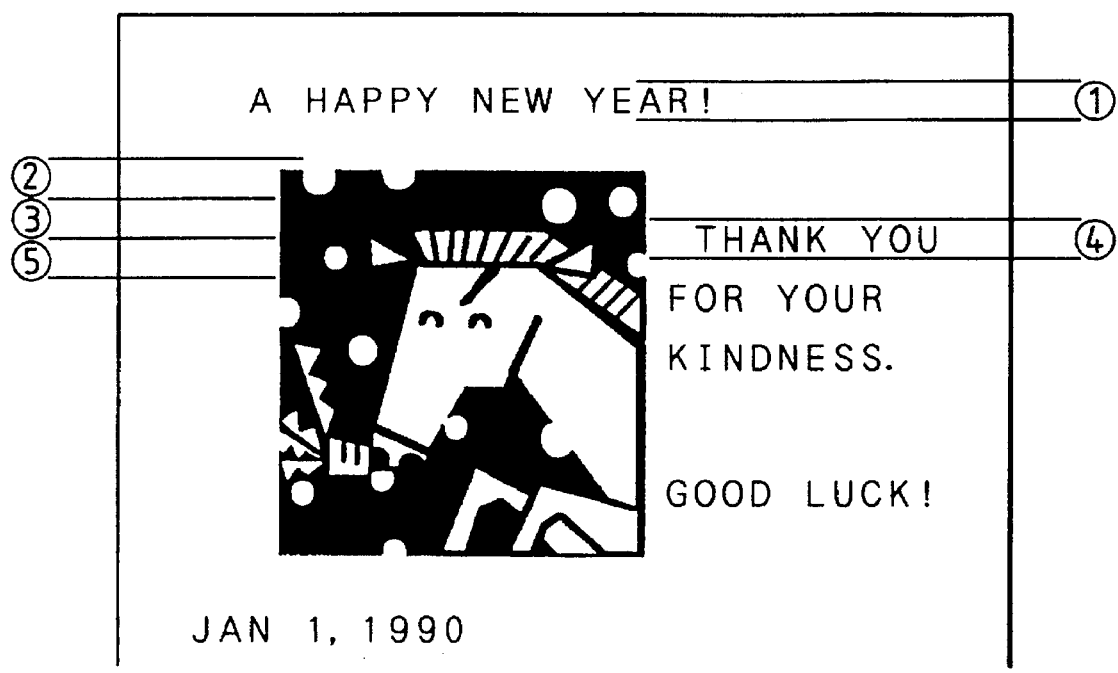

FIGS. 8A to 8C respectively show a state of the document memory DBUF, a print result, and a print order in this embodiment as in FIGS. 4A and 4B.

Figures 1, 18:
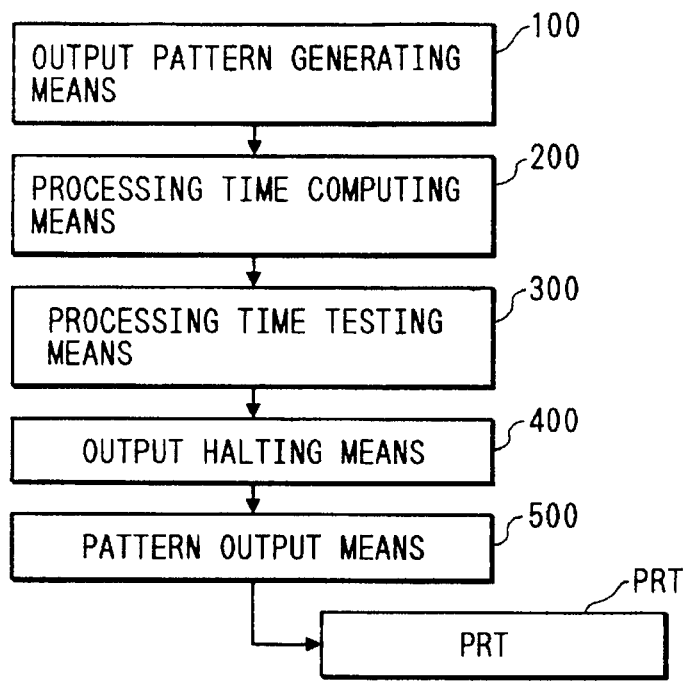
Figures 2, 18:
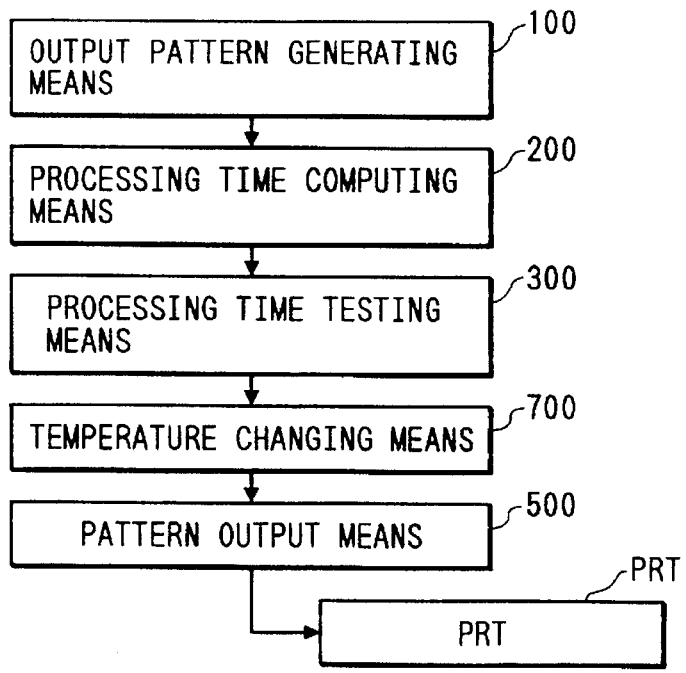
Figures 3, 18:
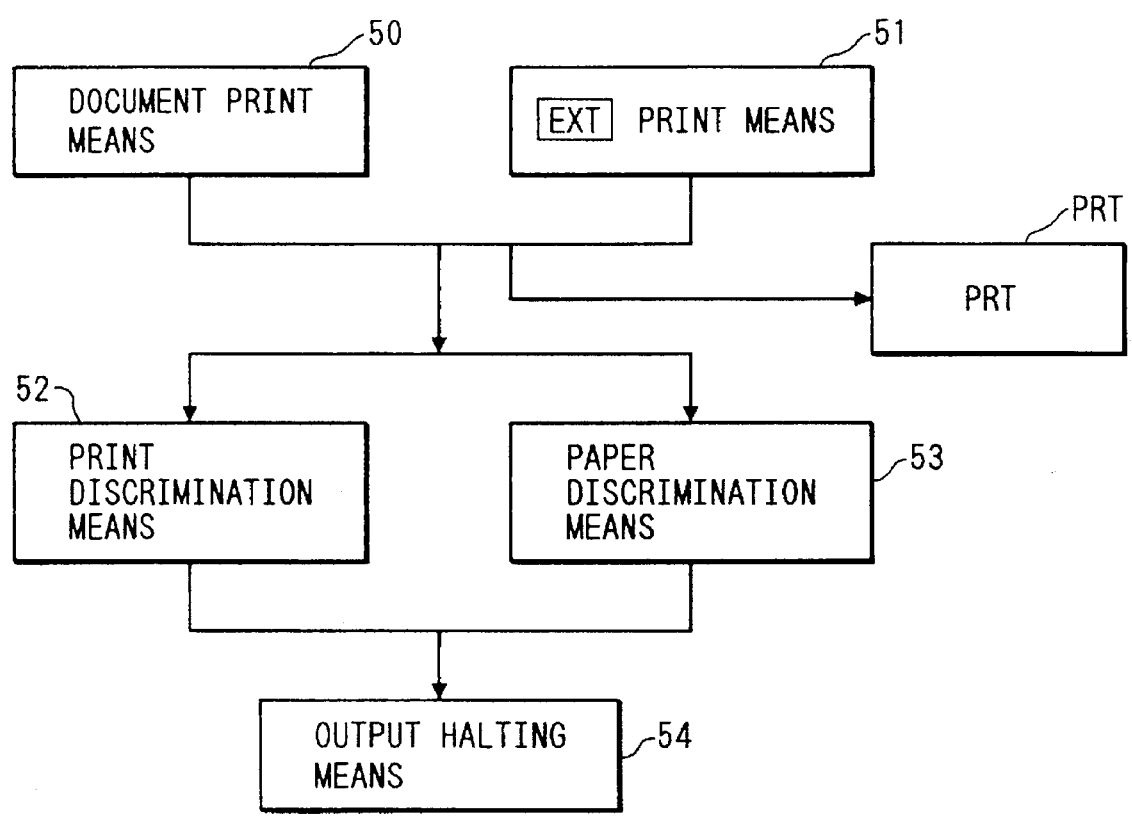
Figures 4, 18:
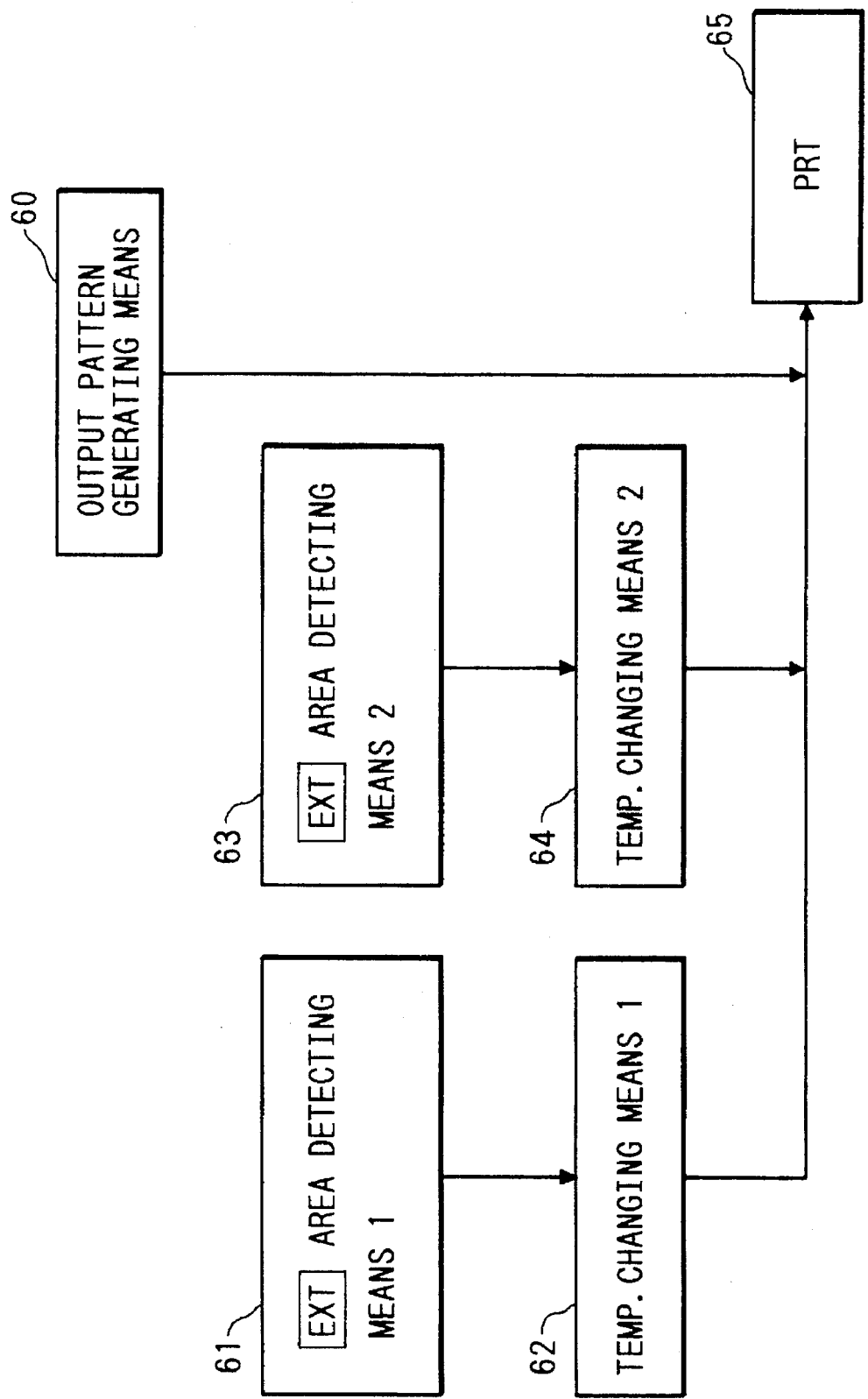

FIG. 8A shows the state of the document memory DBUF shown in FIG. 3 of this embodiment. In this embodiment, the number of characters per line is 20, and each character data in the document memory DBUF is expressed by a character code such as JIS C6226. In FIG. 8A, a rectangle whose right and left sides are defined by symbols EXT, i.e., a rectangle having a diagonal line connecting a point (line 2, column 3) and a point (line 6, column 10), is an extended area. In FIG. 8A, a character string "IMAGE" starting from a point (line 2, column 4) represents that the extended area is an image area. In addition, an area for, e.g., graphs and modified characters excluding normal characters and ruled lines is called the extended area. These data are called data requiring a long processing time or image data.

FIG. 8B shows a print result of the document shown in FIG. 8A by the ink-jet printer PRT. Image data read out from a floppy disk is printed on the extended area shown in FIG. 8A.

FIG. 8C shows a print order of a character portion and the extended area when the print result shown in FIG. 8B is obtained. In this embodiment, the character portion and the extended area are printed by independent print operations, and are sequentially printed from the leading end of a paper sheet. If the number of columns which can be printed during one print operation is the same as the number of vertical dots of a character, the print order is ①, ②, ...

FIG. 9 is a main flow chart showing a control sequence executed by the microprocessor CPU in the document processing apparatus of this embodiment. Assume that document data has already been stored in the document memory DBUF by another document edit processing, or the like, in FIG. 9.

In FIG. 9, initialization processing is performed in step S1 to enable the ink-jet printer PRT, or the like. Note that a detailed description of initialization and a document print operation will be omitted.

In step S2, it is checked if the next data to be printed is a character or an extended area. When a plurality of parallel extended areas are present in a horizontal direction, an extended area to be printed next is determined. If the next data to be printed represents a character, character print processing in step S4 is selected in decision step S2.1. If the next data represents an extended area, extended area print processing S3 is selected in decision step S2.1.

In the extended area print processing in step S3, after a paper sheet set on the ink-jet printer PRT is fed and the ink-jet head is moved (as needed), a pattern is printed on the corresponding extended area. Thereafter, it is checked in decision step S3.1 if the recording medium is a post card. If YES in step S3.1, the flow advances to step S6. If NO in step S3.1, it is checked in decision step S3.2 if the present line is the last line of the extended area. If YES in step S3.2, the flow advances to step S5; otherwise, the flow advances to decision step S6.1.

In the character print processing in step S4, after a paper sheet is fed and the head is moved as in step S3, a pattern corresponding to a character string is printed. Thereafter, it is checked in decision step S4.1 if the recording medium is a post card. If YES in step S4.1, the flow advances to step S6; otherwise, the flow advances to decision step S6.1.

In steps S5 and S6, processing is halted for 10 sec and 3 sec, respectively to wait until an ink on the recording medium is dried.

In decision step S6.1, it is checked if a print operation of a document of one page is completed. If NO in step S6.1, the flow returns to step S2. If YES in step S6.1, a type of recording medium is determined in decision step S6.2. If the type of recording medium is a post card, processing is halted for 45 sec in step S7 to wait again for a sufficient time until the ink is dried.

In step S8, the printed recording medium is exhausted.

(Another Embodiment)

Figure 10:
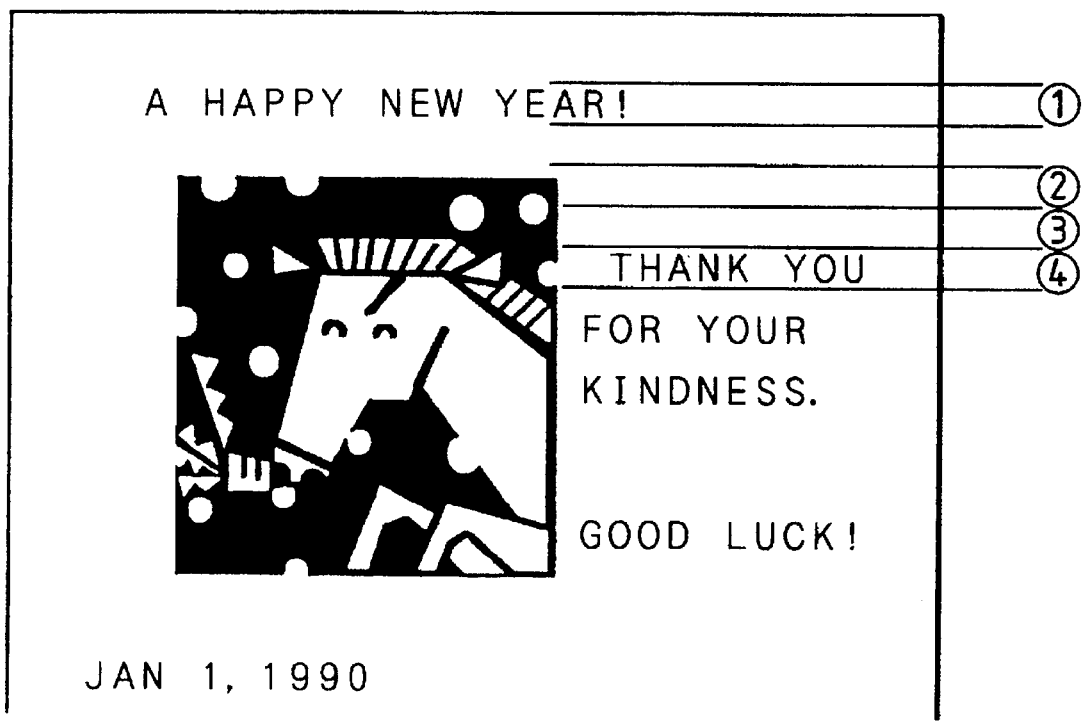
FIG. 10 is a view for explaining still another output result in the embodiment of the present invention.

In this embodiment, a character portion and an extended area portion are independently printed but may be printed by a single print operation. In this case, FIGS. 10 and 11 respectively correspond to FIGS. 8C and 9.

In FIG. 11, step S11 is the same as step S1 in FIG. 9. In step S12, after a paper sheet set on the ink-jet printer is fed and the ink-jet head is moved, patterns corresponding to a character string and an extended area of one line are simultaneously printed. Thereafter, a type of recording medium is checked in decision step S12.1. If the type of recording medium is a post card, processing is halted for 3 sec. Otherwise, it is checked in decision step S12.2 if an extended area is present. If YES in step S12.2, it is checked in step S12.3 if the present line of the extended area is the last line. If YES in step S12.3, processing is halted for 10 sec in step S13.

Processing in decision step S14.1 and subsequent steps are the same as that in decision step S6.1 and subsequent steps in FIG. 9, and a detailed description thereof will be omitted.

Note that the head is controlled to be halted. However, a moving speed of the head may be decreased. This operation can be realized by controlling a pulse motor. The moving speed may be read out from a ROM in correspondence with types of data.

As described above, according to the present invention, a type of mixed pattern data to be output to the ink-jet printer is checked, and data output is appropriately halted for a predetermined period of time according to the checking result. An operator can avoid a printed paper sheet from being accidentally contaminated regardless of types of pattern to be output or types of recording medium.

(Heater Control by Checking Position of Data Requiring Long Processing Time)

Note that heater temperature control is performed as follows by checking the position of data requiring a long processing time.

FIG. 12 shows in detail the RAM shown in block diagram of FIG. 2 for carrying out this embodiment. The RAM includes the print line counter LTC, a post-extended area counter ILC, and a heater status flag HTF.

FIG. 13 is a main flow chart showing a control sequence executed by the microprocessor CPU when the print start key PRK is depressed. Assume that document data has already been stored in the document memory DBUF by another document edit processing, or the like, in FIG. 13.

In FIG. 13, initialization processing is executed in step S1 to enable equipments such as the ink-jet printer PRT connected to the common bus BUS. Note that a detailed description of initialization and a document print operation will be omitted.

In step S2, "−1" is set in the post-extended area counter ILC, "0" is set in the heater status flag HTF, and "1" is set in the print line counter LTC. Note that an extended area is an area where data requiring a relatively long processing time, e.g., an illustration, modified characters, and the like are printed. The post-extended area counter ILC outputs "−1" to indicate that "no extended area is detected", outputs "0" to indicate that "an extended area is being printed", and outputs natural number equal to or larger than 1 to represent the number of lines after the extended area. As will be described later, such outputs are to keep the heater ON during an interval corresponding to the predetermined number of lines. When the heater status flag HTF is "0", it indicates "heater OFF", and when it is "1", it indicates "heater ON".

In decision step S2.1, the content of the document memory DBUF from 1st to mth lines is checked. If an extended area is detected, the flow advances to step S3; otherwise, the flow advances to decision step S4.1. m is set to be, e.g., 5, and upon observation of up to the fifth line ahead of the present line, heater control can be facilitated.

In step S3, the fixing heater of the ink-jet printer PRT is turned on. Thereafter, in step S4, the value of the heater status flag HTF is set to be "1" (heater ON).

In decision step S4.1, the content of a line in the document memory DBUF indicated by a value obtained by adding m to the value of the print line counter is checked. If an extended area is detected, the flow advances to decision step S4.2; otherwise, the flow advances to step S7. In decision step S4.2, the value of the heater status flag HTF is checked. If the flag HTF is "1", the flow advances to step S7 since the heater is kept ON.

If the flag HTF is "0", the fixing heater of the ink-jet printer PRT is turned on. Thereafter, in step S6, the value of the heater status flag HTF is set to be "1" (heater ON).

In step S7, the content of the document memory DBUF corresponding to the print line counter LTC is converted to pattern data to be output to the ink-jet printer PRT, and the pattern data is output. Thereafter, the value of the print line counter LTC is incremented by one in step S8.

It is checked in decision step S8.1 if the pattern data output in step S7 is extended area data. If YES in step S8.1, the value of the post-extended area counter ILC is set to be "0" (the extended area is being printed).

In decision step S9.1, the value of the heater status flag HTF is checked. If the flag HTF is "0" (heater OFF), the flow advances to decision step S13.1. However, if the flag HTF is "1", the value of the post-extended area counter ILC is checked in decision step S9.2 If the counter ILC is "−1" (no extended area is detected), the flow advances to decision step S13.1. Otherwise, the value of the post-extended area counter ILC is incremented by "1" in step S10. It is checked in decision step S10.1 if the value of the counter ILC exceeds n. If the print operation of the extended area is not completed yet, since it is determined in step S9 that the value of the post-extended area counter ILC is "0", the value detected in step S10.1 is "1", and does not exceed n. Therefore, the value exceeds n only when n lines have counted after completion of the print operation of the extended area. In this case, the fixing heater of the ink-jet printer PRT is turned off in step S11, and the value of the heater status flag HTF is set to be "0" (heater OFF) in step S12. Furthermore, in step S13, the value of the post-extended area counter ILC is set to be "−1" (no extended area is detected).

It is checked in decision step S13.1 if all the contents of the document memory DBUF are printed. If NO in step S13.1, the flow returns to decision step S4.1. In this embodiment, even when an extended area and character data are present in the same line, the heater is always controlled regarding the extended area. Note that the heater is turned on/off in this embodiment. However, the temperature of the heater may be switched among three levels, i.e., character level, extended area level, and character+extended area level.

As described above, according to the present invention, the presence of an extended area can be detected the predetermined number of lines before a pattern to be output to the ink-jet printer becomes extended area data. Thus, the heater is kept on during an interval corresponding to the predetermined number of lines, so that a printed paper sheet can be avoided from being unnecessarily contaminated.

(Fourth Embodiment: Fixing Processing Regarding Type of Recording Medium, Type of Recording Image, and Difference in Print Density)

Figure 14:
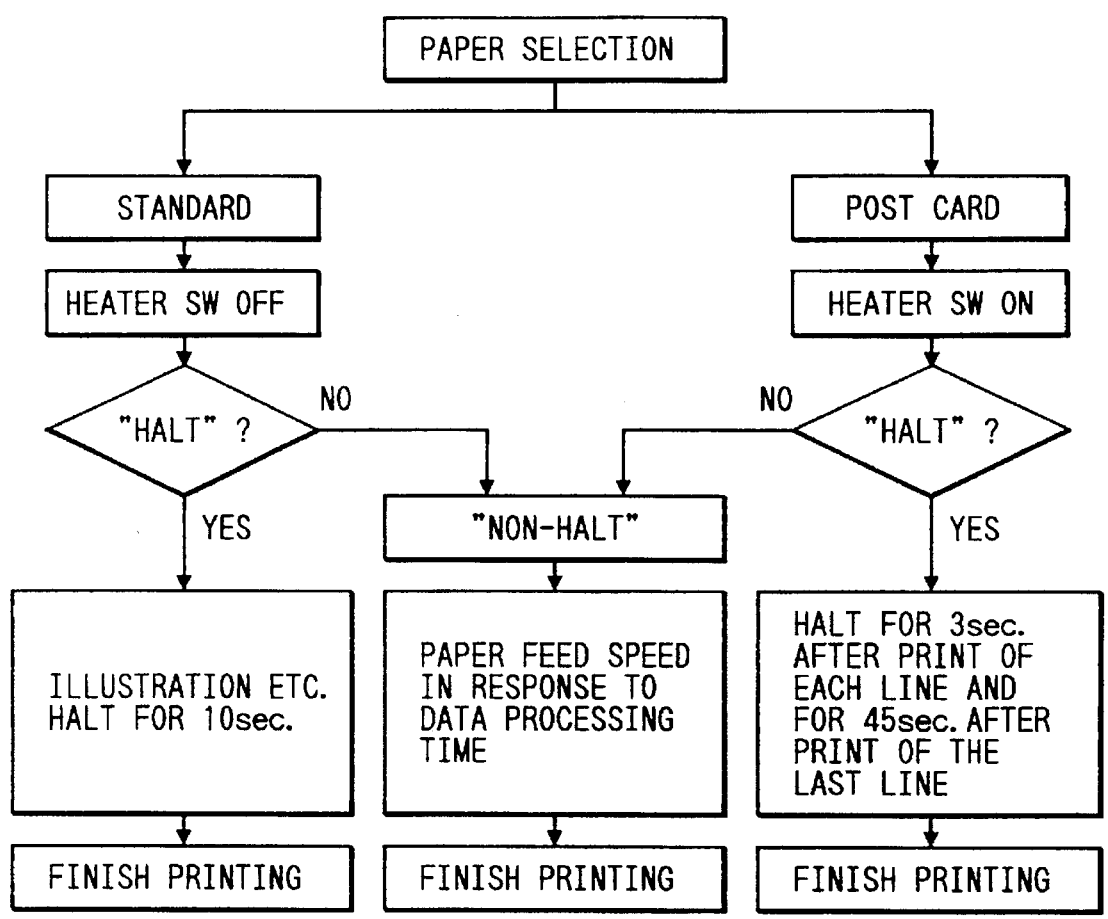
FIG. 14 is a flow chart showing still another control means according to the embodiment of the present invention.

Fixing processing regarding a type of recording medium, a type of recording image, and a difference in print density will be explained below with reference to FIG. 14.

An equipment comprises a heater switch (SW) which can turn on/off a fixing heater depending on whether a print paper sheet to be used is a standard paper sheet or a thick paper sheet (post card). A fixing mode is added to a print mode setup menu of a wordprocessor (WP), so that a user can select one of two different fixing modes, i.e., "HALT" and "non-HALT".

A paper feed speed in the "non-HALT" fixing mode depends on a data processing time of the WP main body regardless of a type of paper sheet to be used.

In the "HALT" fixing mode, a paper feed speed is changed according to a type of paper sheet. On the print mode setup menu, a standard paper sheet or a post card can be selected in a format setup mode, and when the type of recording medium is designated, a paper feed speed corresponding to the selected type of recording medium is attained.

When a standard paper sheet is heated by the fixing heater, the sheet may be contaminated due to curl or shrinkage of the sheet, or printed ruled lines may be offset. Therefore, the heater is turned off by the heater SW. When a print content corresponds to a character or a ruled line, i.e., a print duty is low, the "non-HALT" fixing mode is selected since a good fixing property can be assured. After execution of a print operation, a paper feed speed according to a data processing speed is set, thus executing the print operation.

When the print content is an illustration, modified characters, or a solid black area as a background image of an outline font, i.e., has a high print duty, the "HALT" fixing mode is selected since such a portion impairs a fixing property. After execution of a print operation, the last line of the illustration or solid black area is printed, and then, a paper feed operation is halted for a predetermined period of time. Thereafter, the paper feed operation is restarted. In this embodiment, the halt time is set to be about 10 sec. The halt time can be changed depending on types of paper to obtain optimal print results, and multiple halt times may be set.

The halt operation is executed for only an area with a high print duty, and is not executed for a standard document area. Therefore, when a document including both the areas is printed, a throughput will not be unnecessarily impaired.

When a paper sheet having a poor fixing property such as a post card is used, the heater SW turns on the heater.

When only standard characters or addresses are to be printed, the "non-HALT" mode is selected as for the standard paper sheet.

The print operation is executed at a paper feed speed according to a data processing time. In this case, the heater temperature is set to assure a good fixing property of a post card with the above print content, and is about 48° C. in this embodiment.

When the "HALT" fixing mode is selected, a print operation is performed such that a paper feed operation is halted for 3 sec for every line, and is halted for 45 sec after the last line is printed.

Thus, even when data having a high print duty, such as an illustration, a solid black background area of a modified character or an outline font, or the like, is printed, a printed paper sheet is free from contamination such as a black spur mark of a non-fixed portion.

For a post card, a halt time is inserted for each line regardless of a print content unlike for a standard paper sheet because a fixing property of the post card is poorer than that of the standard paper sheet.

In this embodiment, a heater ON/OFF state is selected by the external SW attached to the printer. This selection may be made to be interlocked with selection of a type of paper on the print menu, thereby automatically turning on/off the heater. Alternatively, a large number of temperatures may be set.

(Fifth Embodiment: Color Image Processing)

Various fixing processing operations described above are more effective when color images are to be obtained.

FIG. 15A shows a processing sequence in a data reception mode. This embodiment exemplifies processing for setting a detection means for detecting whether a recording medium is a designated sheet or a non-designated sheet according to keys such as a Dip SW, a panel SW, a detection SW arranged in a designated sheet path, a designated sheet cassette insertion presence/absence SW, a designated sheet roll load SW, and the like.

Data indicating a designated sheet or a non-designated sheet indicates the designated sheet, for example, when the detection SW is ON. After a controller is initialized upon power-on (S100), a CPU detects SW data through an input port. The CPU waits while monitoring control commands and recording data input from a host apparatus, connected to a printer, through an interface (S102).

In this embodiment, color bit image data is set in the following specification in correspondence with a host apparatus:

ESC r. DATA LENGTH. IMAGE DATA

"ESC r" indicates a color bit image setup command.

"DATA LENGTH" is a 2-byte parameter, and indicates the total number of bytes of image data in this command.

Assume that first "n" bytes of "IMAGE DATA" indicate red (R), next "n" bytes indicate green (G), and the last "n" bytes indicate blue (B).

When recording data is input from a host apparatus connected to a printer according to this embodiment in step S102, a CPU 21 stores it in a reception RGB buffer allocated in a data memory such as DBUF in FIG. 2 in step S103. The CPU repeats a sequence in steps S102 to S104 until it is determined that reception of a predetermined volume of recording data (corresponding to a capacity of the reception buffer or one scanning) is completed (step S104).

Figures 17A, 17B:
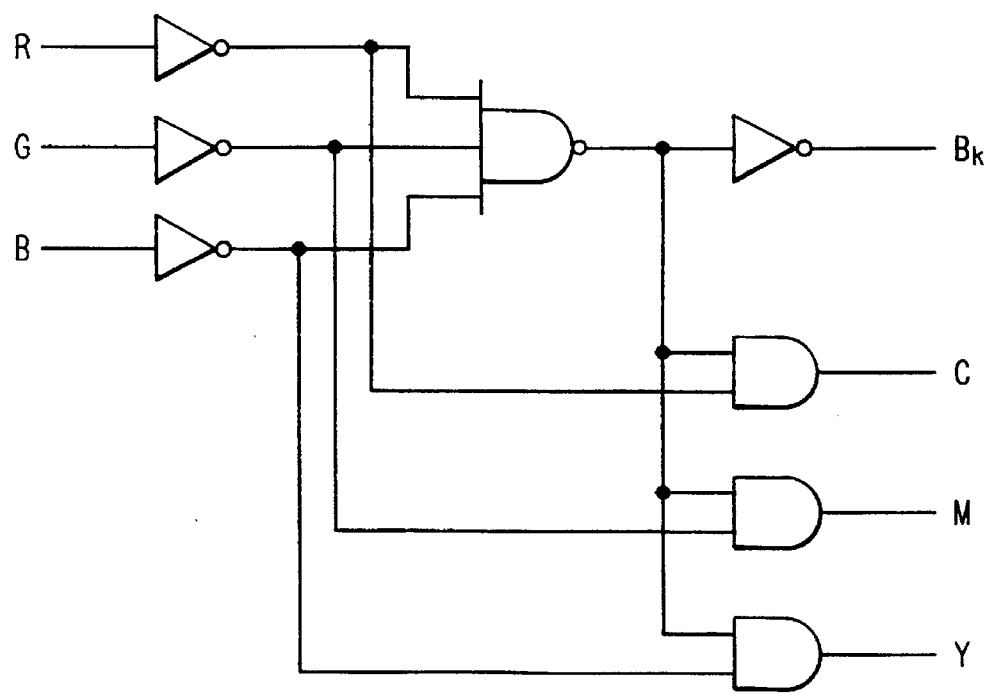
FIGS. 17A and 17B are views for explaining a conversion logic for obtaining Y, M, C, and Bk data from R, G, and B data.

If the CPU determines completion of reception in step S104, it performs color conversion of received data as shown in FIG. 17A, and stores converted data in a recording YMCBk buffer allocated in the data memory in step S105. FIG. 17B shows a logic circuit for carrying out the color conversion shown in FIG. 17A.

Figure 15B:
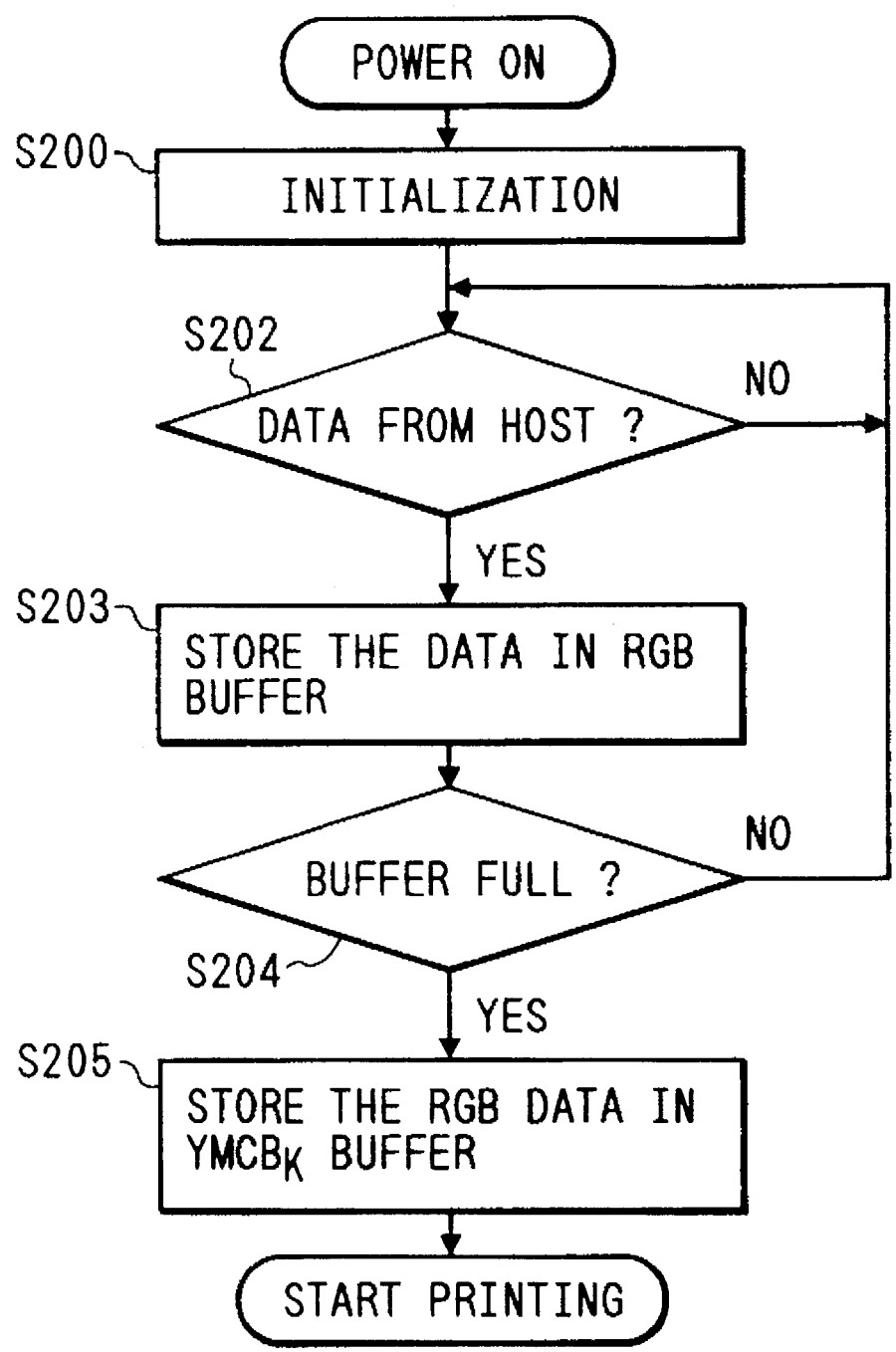

FIG. 15B shows another processing sequence in a data reception mode. In this embodiment, a means for switching whether a recording medium is a designated sheet or a non-designated sheet is obtained according to a command from a host computer connected to a printer or print mode data.

After power-on, a CPU initializes a controller (S200). The CPU then waits input of a control command from a host apparatus 14 connected to a printer and recording data while monitoring them through an interface 22. In this embodiment, a control command is set in the following specification in correspondence with the host apparatus:

ESC 0 reception mode designated sheet mode
ESC 1 reception mode non-designated sheet mode In a mode with a low dot density, e.g., a character print mode, a designated sheet mode is set. When no special designation is made by the designated sheet command, a non-designated sheet mode is set in a mode with a high dot density, e.g., in a bit image print mode. In step S202, when recording data is input from the host apparatus connected to the printer according to this embodiment, the CPU stores the recording data in a reception RGB buffer allocated in a data memory in step S203. The CPU repeats a sequence in steps S202 to S204 until it is determined that reception of a predetermined volume of recording data (corresponding to a capacity of the reception buffer or one scanning) is completed (step S204).

If the CPU determines completion of reception in step S204, it performs color conversion of received data as shown in FIG. 17A, and stores converted data in a recording YMCBK buffer allocated in the data memory in step S205.

Figure 16A:
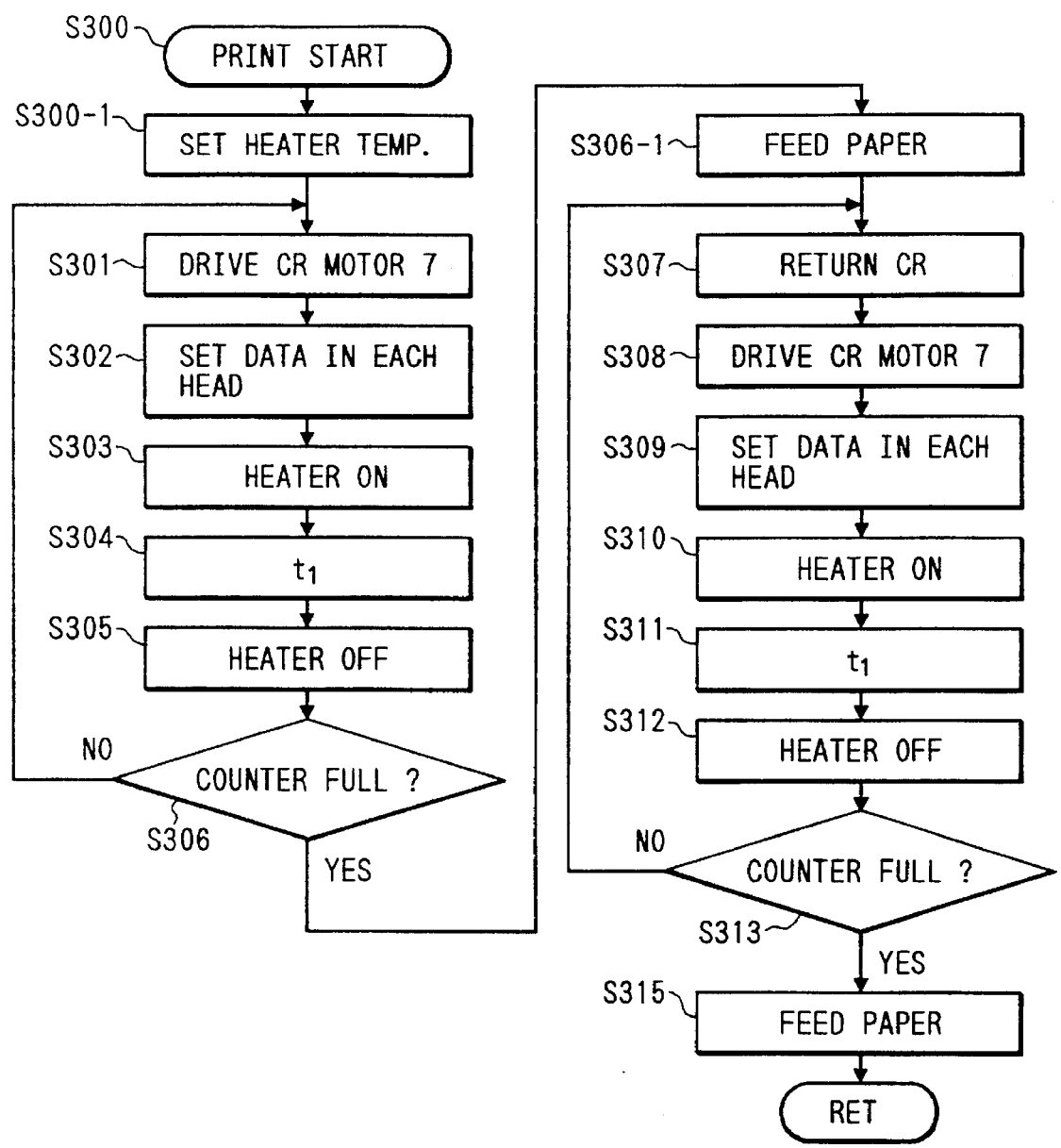
FIGS. 16A and 16B are flow charts showing still another control means according to the embodiment of the present invention.

FIG. 16A shows recording processing and a fixing control sequence executed after the processing shown in FIG. 15A or 15B. In this embodiment, a temperature of a fixing heater arranged at a portion which contacts a recording medium is varied according to detection data or setup data. The fixing heater control is not performed in, e.g., the designated sheet mode. The temperature of the heater is set at about 48° C. in a non-designated sheet mode. In this embodiment, recording processing is realized by bidirectional (or reciprocal) recording.

After data is developed from the RGB buffer allocated in the data memory 23 to the YMCBk buffer, the CPU starts forward recording.

If the CPU determines the non-designated sheet mode in step S300-1, it sets the fixing heater temperature at about 48° C. In this embodiment, the fixing heater can be quickly set at 60° C. after it is turned on. In some cases, however, a time for the fixing heater may be required. A temperature of the fixing heater may be more finely controlled depending on detailed recording medium data in correspondence with recording media.

In step S301, the CPU rotates a carriage motor 7 in a forward direction to move a carriage 6 in a PT direction from an output through a driver 27.

In step S302, controller 29 sets recording data in a head. After the data is set, predetermined pulses are applied to the head in step S303. In this case, a pulse width is defined by a hardware or software timer t1. After this timer is time-up, energization of the head is stopped (steps S304 and S305).

At the same time, in step S305, a recording cycle counter allocated in a working memory is incremented by "1" for every energization.

It is checked in step S306 based on the recording cycle counter if recording is completed. If it is determined in step S306 that the content of the recording cycle counter does not exceed a predetermined number of recording dots during one scanning, the flow returns to step S301, and the operations in steps S301 to S306 are repeated.

If it is determined in step S306 that the content of the recording cycle counter exceeds the predetermined number of recording dots, a paper sheet is fed, and the flow advances to step S307 to clear the recording cycle counter.

The CPU then starts reverse recording. In step S308, the CPU 21 rotates the carriage motor in the reverse direction in accordance with a signal from the output port 26 through the driver 27 to move the carriage in a CR direction. In step S309, the 10 controller sets recording data in the head from the last bit. After the data is set, predetermined pulses are applied to the head in step S310. In this case, the pulse width is also defined by the timer t1 in the same manner as described above. After the timer is time-up, energization of the head is stopped (steps S311 and S312).

At the same time, the recording cycle counter is incremented by "1" for every energization.

It is checked based on the recording cycle counter in step S313 if the recording is completed. If it is determined in step S313 that the content of the recording cycle counter does not exceed the predetermined number of recording dots, the flow returns to step S308, and operations in steps S308 to S313 are repeated.

If it is determined in step S313 that the content of the recording cycle counter exceeds the predetermined number of recording dots, the reciprocal recording is completed. The flow advances to step S315 to prepare for recording of the next line. That is, the paper feed motor is driven through the output port and the driver to feed the recording medium by one line, and the recording cycle counter is cleared.

(Sixth Embodiment)

Figure 16B:
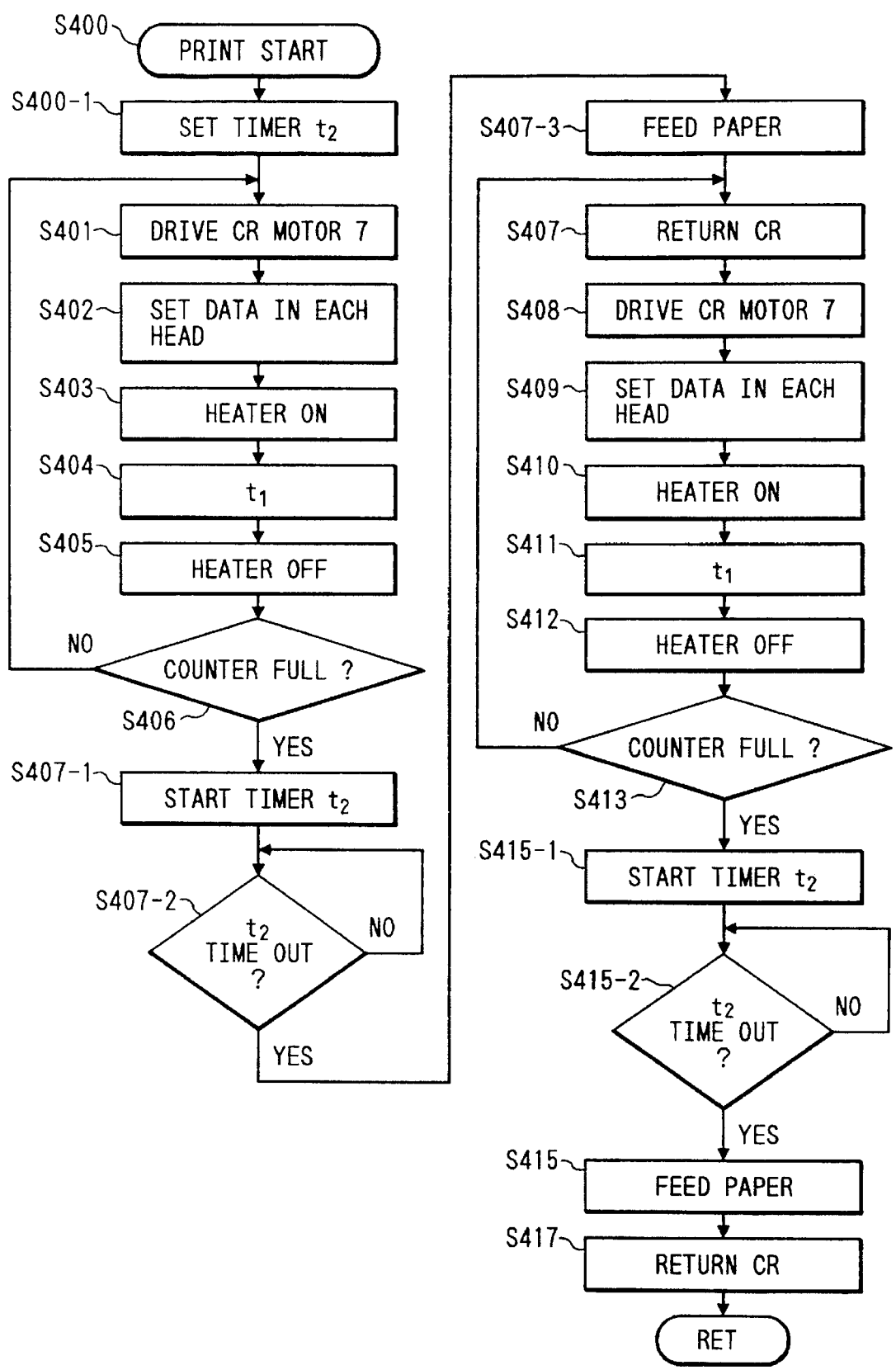

FIG. 16B shows recording processing and a fixing control sequence executed after the processing shown in FIG. 15A or 15B. In this embodiment, a time during which a fixing heater arranged on a portion where a recording medium contacts is brought into contact with the recording medium after a print operation is varied according to detection data or setup data. For example, in a designated sheet mode, a special fixing contact time is set to be "0", and in a non-designated sheet mode, the fixing contact time is set to be n sec. In this embodiment, recording processing is realized by unidirectional recording.

After data is developed from an RGB buffer to a YMCBk buffer allocated in a data memory 23, a CPU 21 starts recording (S400).

If the CPU 21 determines, e.g., the non-designated sheet mode, it sets the fixing heater contact time to be n sec in step S400-1. In this embodiment, the contact time is varied between the two modes, i.e., the designated sheet mode and the non-designated sheet mode. Recording medium data may be more finely classified so that more contact times may be set in correspondence with recording media.

In step S401, the CPU rotates a carriage motor 7 in a forward direction to move a carriage 6 in a PT direction from an output through a driver 27. In the unidirectional recording mode, the CPU 21 executes steps S401 to S406 which are the same as steps S301 to S306 in the reciprocal recording of the third embodiment, thereby performing recording.

In step S407-1, a fixing timer is started to measure a time required for fixing an ink on the recording medium. In step S407-2, it is checked if the timer is time-out. Thereafter, a paper sheet is fed by one line, and a carriage is returned in step S406. The same operations as described above are executed in steps S408 to S417, thus completing print operations of two lines.

The present invention is particularly effective for a bubble-jet recording head and recording apparatus among ink-jet recording systems since the bubble-jet system can realize high-density recording and requires a fixing device for accelerating fixing depending on recording patterns.

The typical arrangement and principle of this system preferably employ the basic principles disclosed in U.S. Pat. Nos. 4,723,129 and 4,740,796. This system can be applied to either an on-demand type or continuous type. In particular, when this system is applied to the on-demand type, at least one drive signal for giving an immediate temperature rise for attaining film boiling in correspondence with recording data is applied to an electro-thermal conversion element arranged in correspondence with a sheet or a liquid path retaining a liquid (ink), thereby causing the electro-thermal conversion element to generate heat energy. Film boiling occurs at a heat application surface of the recording head, and as a result, a bubble can be formed in the liquid (ink) to have a one-to-one correspondence with this drive signal. The liquid (ink) is ejected from an ejection opening upon growth and shrinkage of the bubble, thereby forming at least one droplet. It is more preferable that when the drive signal is applied in a pulse form, bubbles can be immediately and appropriately grown and shrunk. Pulse drive signals described in U.S. Pat. Nos. 4,463,359 and 4,345,262 are suitable. When conditions described in U.S. Pat. No. 4,313,124 of the invention associated with a temperature rise rate of the heat application surface are adopted, better recording can be assured.

As an arrangement of the recording head, the present invention incorporates arrangements using specifications of U.S. Pat. Nos. 4,558,333 and 4,459,600 as well as a combination of an ejection opening, a liquid path, and an electro-thermal conversion element disclosed in the above-mentioned specifications (linear or right-angle liquid flow path). In addition, the present invention is also effective for arrangements based on Japanese Pat. Laid-Open Application No. 59-123670 which discloses an arrangement that a slit common to a plurality of electro-thermal conversion elements serves as an ejection section, and Japanese Pat. Laid-Open Application No. 59-138461 which discloses an arrangement that an opening for absorbing a pressure wave of heat energy is arranged in correspondence with an ejection section.

A full-line type recording head having a length corresponding to a width of a maximum recording medium which can be used in recording by the recording apparatus may be constituted by a combination of a plurality of recording heads or an integrally formed recording head. The present invention can provide the above-mentioned effects using these heads. The present invention is also effective when an exchangeable chip type recording head which is loaded on an apparatus main body to allow an electrical connection with the apparatus main body and supply of an ink from the apparatus main body or a cartridge type recording head integrally arranged on a recording head itself is used.

Types and number of recording heads to be mounted are not particularly limited. For example, only one head may be arranged in correspondence with an ink having one color or a plurality of heads may be arranged in correspondence with a plurality of inks having different recording colors or densities.

As described above, according to the present invention, there can be provided an ink-jet printer which can satisfactorily perform fixing regardless of types of image to be recorded, e.g., images whose patterns may or may not be prestored in a wordprocessor main body, in other words, a stay time on a fixing heater.

In a wordprocessor, recording is frequently performed not only on standard paper sheets but also on relatively thick recording media such as post cards. In this case, according to the present invention, there can be also provided an ink-jet printer which can satisfactorily perform fixing not only for standard sheets but also for such thick recording media.

Furthermore, according to the present invention, a time necessary for editing pattern data to be transferred to a recording apparatus or a thickness of a recording medium is automatically discriminated, and data transfer is halted for a predetermined period of time or heater temperature control is performed according to the detected information.

Therefore, an operator can avoid a printed-sheet from being unnecessarily contaminated regardless of a pattern to be output.

The embodiments of the present invention described above will be partially summarized below.

A document processing apparatus according to the present invention may be constituted by a plurality of equipments or an integrated equipment. The present invention can also be applied when a document processing function is attained by supplying a program to a given apparatus.

FIG. 18-1 shows an arrangement of an embodiment of the present invention.

[Halt Output (Prolonging Stay Time) When Processing Time is Short]

In FIG. 18-1, an output pattern generating means 100 generates a pattern to be output to an ink-jet printer PRT.

A processing time computing means 200 computes a time required for generating the output pattern by the output pattern generating means.

A processing time testing means 300 checks if the time obtained by the processing time computing means is shorter than a predetermined time.

When the processing time testing means determines that the computed time is shorter than the predetermined time, an output halting means 400 halts output processing until the predetermined time is reached. In this case, data to be output may be inhibited from being transferred from a print buffer to an output side or data may be inhibited from being output from a data buffer to a print buffer. A transfer halt state, an output halt state, and interruption of a convey operation of a medium are equivalent to each other. That is, a stay time need only be prolonged.

A pattern output means 500 outputs the pattern generated by the pattern generating means 100 to the ink-jet printer PRT.

[Decrease Temperature When Processing Time is Long]

FIG. 18-2 shows another arrangement in the embodiment of the present invention. A description of portions common to FIG. 18-1 will be omitted. A processing time testing means 300 checks if a computed time exceeds a predetermined time. When the computed time exceeds the predetermined time, a temperature changing means 700 changes a temperature of a fixing heater.

[Convey Control When Image Data (Requiring Long Processing Time) and Character Data (Requiring Short Processing Time) are Mixed]

FIG. 18-3 shows an arrangement of this embodiment.

In FIG. 18-3, a document print means 50 generates a pattern to be output to an ink-jet printer PRT on the basis of document data.

An EXT print means 51 generates a pattern for outputting an extended area (graphs, images, modified characters, and the like) to the ink-jet printer PRT.

A print discrimination means 52 discriminates whether a printed pattern is a document or an extended area.

A paper discrimination means 53 discriminates whether or not a recording medium loaded on the ink-jet printer PRT is a post card.

An output halting means 54 halts processing for a predetermined period of time according to results from the print discrimination means 52 and the paper discrimination means 53.

[Heater Temperature Control by Discriminating Position of Data Requiring Long Processing Time]

FIG. 18-4 shows an arrangement of the embodiment of the present invention.

In FIG. 18-4, an output pattern generating means 60 generates a pattern to be output to an ink-jet printer 65 (PRT).

An EXT area detecting means 1 (61) detects the number of lines from a line which is being output by the pattern generating means before an extended area.

A temperature changing means 1 (62) turns on a fixing heater when the number of lines obtained by the EXT area detecting means 1 (61) is a predetermined value (m).

An EXT area detecting means 2 (63) detects the number of lines to a line which is being output by the output pattern generating means after an extended area.

A temperature changing means 2 (64) turns off the fixing heater when the number of lines detected by the EXT area detecting means 2 (63) is a predetermined value (n).

[Outer Appearance]

Figures 2, 19:
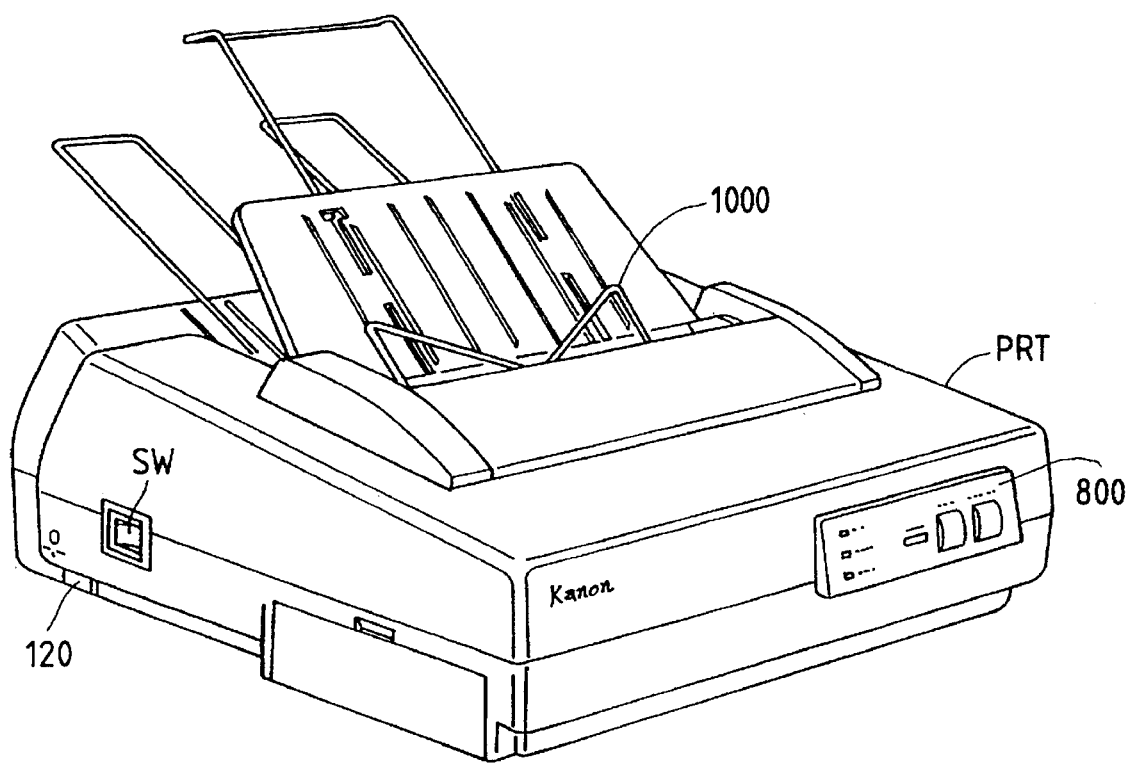
Figures 3, 19:
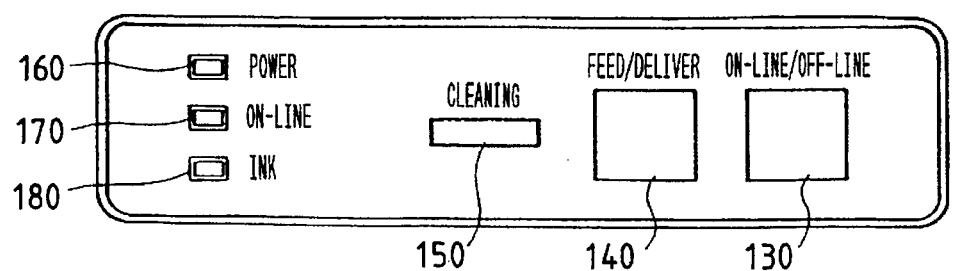

FIG. 19-1 shows an outer appearance of a document processing apparatus of the present invention. In FIG. 19-1, a keyboard KB is used to input data. A display unit CRT displays document data. A floppy disk unit FDD drives a floppy disk which can store document data and a control program, and has an eject button, an access lamp, and the like.

The apparatus includes a system power switch SW, a power supply plug 501, an equipment main body 601, and a luminance control dial 701.

An ink-jet printer PRT is connected to the equipment main body 601 via an interface cable 901.

[Perspective View]

FIG. 19-2 is a perspective view of the ink-jet printer PRT. FIG. 19-3 is a view for explaining an operation panel 800. In FIG. 19-2, a deliver sheet guard 1000 prevents insertion of a printed paper sheet from a manual insertion slot. The apparatus PRT has a power switch SW, and a heater switch 120. The heater switch is used to turn on/off a heater for drying an ink when data is printed on a paper sheet such as a post card in which an ink is not easily dried. A switch 130 switches between on- and off-line modes. Note that these modes may be automatically switched. A switch 140 switches between manual paper feed and deliver modes in the off-line mode. A switch 150 is used to instruct a cleaning operation. When the apparatus PRT is used for the first time or is re-used after it has not been used for a long period of time, the switch 150 instructs to remove clogging of a print head. Lamps 160, 170, and 180 respectively indicate a power-on state, the on-line mode, and a state wherein no ink cartridge is loaded or an ink is used up (or little ink remains).

As described above, according to the present invention, a time necessary for editing pattern data to be transferred to a recording apparatus is automatically discriminated, and data transfer is halted for a predetermined period of time according to the discriminated time. Therefore, an operator can avoid a printed sheet from being unnecessarily contaminated regardless of a pattern to be output.

Alternatively, as described above, according to the present invention, a time necessary for editing pattern data to be transferred to a recording apparatus is automatically discriminated, and a temperature of a heater is automatically changed accordingly. Therefore, an operator can avoid a printed sheet from being unnecessarily contaminated regardless of a pattern to be output.

As described above, according to the present invention, there can be provided a document processing apparatus comprising a convey means for conveying a recording medium, an output means for outputting pattern data to the recording medium conveyed by the convey means, a generating means for generating a pattern to be output, a calculating means for calculating a generation time of pattern data by the generating means, and a stay time control means for controlling the convey means on the basis of the generation time calculated by the calculating means, thereby changing a stay time of the recording medium.

As described above, according to the present invention, there can be provided a document processing apparatus comprising an output means, having a heater unit, for outputting pattern data, a generating means for generating a pattern to be output, a processing time calculating means for calculating a generation time of pattern data by the generating means, and heater control means for controlling the heater unit on the basis of the generation time calculated by the processing time calculating means.

As described above, according to the present invention, there can be provided a document processing apparatus comprising a serial type output means, having a head unit, for serially outputting pattern data, a discrimination means for discriminating a type of pattern data, and a head movement control means for controlling movement of the head unit in a serial output direction after output operations of different types of pattern data present in the same line are completed.

As described above, according to the present invention, there can be provided a document processing apparatus comprising a storage means for storing data to be output, a discrimination means for discriminating the presence of pattern data which requires a long processing time on the basis of the data stored in the storage means, output means, having a heater unit, for outputting pattern data, and a heater control means for, when it is discriminated that the pattern requiring the long processing time is present, controlling the heater unit before the output means outputs the pattern data.

As described above, according to the present invention, there can be provided an ink-jet printer which can satisfactorily perform fixing regardless of types of images to be recorded, e.g., images whose patterns may or may not be prestored in a wordprocessor main body, in other words, a stay time on a fixing heater.

In a wordprocessor, recording is frequently performed not only on standard paper sheets but also on relatively thick recording media such as post cards. In this case, according to the present invention, there can also be provided an ink-jet printer which can satisfactorily perform fixing not only for standard sheets but also for such thick recording media.

Furthermore, there can be provided an ink-jet printer which controls both a fixing temperature and a stay time of the recording medium in systematic consideration of various conditions such as a type of image to be recorded, a thickness of a recording medium, a print density, and the like, thereby achieving satisfactory fixing processing.

According to the present invention, a time necessary for editing pattern data to be transferred to a recording apparatus and a thickness of a recording medium are automatically discriminated, and data transfer is halted for a predetermined period of time or heater temperature control is performed accordingly. Therefore, a printed paper sheet can be prevented from being unnecessarily contaminated.

Since fixing is performed by selectively turning on/off a heater, power consumption can be saved.

Furthermore, according to the present invention, a time necessary for editing pattern data to be transferred to a recording apparatus and a thickness of a recording medium are automatically discriminated, and data transfer is halted for a predetermined period of time or heater temperature control is performed accordingly. Therefore, an operator can prevent a printed paper sheet from being unnecessarily contaminated regardless of a pattern to be output.

What is claimed is:

1. A recording controlling apparatus comprising:

recording means for executing a recording operation on a recording medium by ejecting ink drops in accordance with pattern data developed during a developing time and based on print data comprising current print data and preceding print data;

determining means for determining whether the current print data is data that requires the developing time to develop into pattern data to be long; and control means for controlling said recording means to ordinarily execute the recording operation for the current print data in response to a determination by said determining means that the current print data requires the long developing time, and controlling said recording means to delay the recording operation for the current print data to fix ink droplets ejected for the preceding print data in response to a determination by said determining means that the current print data does not require the long developing time.

2. An apparatus according to claim 1, further comprising input means for inputting print data.

3. An apparatus according to claim 1, wherein said recording means comprises a serial printer and said control means controls said recording means to delay the recording operation for the current print data by a scanning line unit in response to a determination by said determining means that the current print data does not require the long developing time.

4. An apparatus according to claim 1, wherein said control means controls said recording means to delay the recording operation for the current print data by transmitting no pattern data to said recording means after an end of the recording operation by one line.

5. An apparatus according to claim 1, wherein said control means controls said recording means to delay the recording operation by disabling said recording means in a predetermined time after an end of the recording operation by one line.

6. An apparatus according to claim 1, wherein said recording means ejects the ink drops by means of thermal energy.

7. An apparatus according to claim 1, further comprising a heater for accelerated drying of the ink drops ejected on the recording medium.

8. An apparatus according to claim 1, wherein the print data requiring the long developing time comprises outline font data.

9. An apparatus according to claim 1, wherein the print data requiring the long developing time comprises data read out from a magnetic storage medium.

10. An apparatus according to claim 1, further comprising discriminating means for discriminating whether the recording medium has a good ink-fixing property, wherein said control means controls said recording means to ordinarily execute the recording operation for the current print data in response to a determination by said determining means that the current print data requires the long developing time and in response to a discrimination by said discriminating means that the recording medium has the good ink-fixing property, and controls said recording means to delay the recording operation for the current print data to fix ink droplets ejected for the preceding print data in response to a determination by said determining means that the current print data does not require the long developing time and in response to a discrimination by said discriminating means that the recording medium does not have the good ink-fixing property.

11. An apparatus according to claim 10, wherein said discriminating means discriminates whether the recording medium has the good ink-fixing property in response to information from a sensor.

12. An apparatus according to claim 10, wherein said discriminating means discriminates whether the recording medium has the good ink-fixing property in response to designation by an operator.

13. An apparatus according to claim 10, wherein said discriminating means discriminates whether the recording medium has the good ink-fixing property depending on whether the recording medium is a postcard.

14. A recording controlling apparatus comprising:
   recording means for executing a recording operation on a recording medium by ejecting ink drops based on print data, the print data being of a heavy printing duty or not of a heavy printing duty and comprising current print data and subsequent print data;
   determining means for determining whether the current print data has the heavy printing duty; and
   control means for controlling said recording means to ordinarily execute the recording operation for the subsequent print data in response to a determination by said determining means that the current print data does not have the heavy printing duty, and controlling said recording means to delay the recording operation for the subsequent print data to fix ink droplets ejected for the current print data in response to a determination by said determining means that the current print data has the heavy printing duty.

15. An apparatus according to claim 14, further comprising designation means for designating a fixing mode, wherein said control means controls said recording means to ordinarily execute the recording operation for the subsequent print data regardless of a determination by said determining means when the fixing mode is not designated by said designation means, and controlling said recording means to delay the recording operation for the subsequent print data to fix ink droplets ejected for the current print data in response to a determination by said determining means that the current print data has the heavy printing duty when the fixing mode is designated by said designation means.

16. An apparatus according to claim 14, further comprising input means for inputting print data.

17. An apparatus according to claim 14, wherein said recording means comprises a serial printer and said control means controls said recording means to delay the recording operation for the subsequent print data after the recording operation for the last line of the current print data.

18. An apparatus according to claim 14, wherein said control means controls said recording means to delay the recording operation for the subsequent print data by transmitting no pattern data to said recording means after an end of the recording operation by one line.

19. An apparatus according to claim 14, wherein said control means controls said recording means to delay the recording operation for the subsequent print data by disabling said recording means in a predetermined time after an end of the recording operation by one line.

20. An apparatus according to claim 14, wherein said recording means ejects the ink drops by means of thermal energy.

21. An apparatus according to claim 14, further comprising a heater for accelerated drying of the ink drops ejected on the recording medium.

22. An apparatus according to claim 14, wherein the print data having the heavy printing duty comprises black-dominant data.

23. An apparatus according to claim 14, wherein the print data having the heavy printing duty comprises an illustration.

24. A method of controlling recording in a recording apparatus having recording means for recording on a recording medium by ejecting ink drops in accordance with pattern data developed during a developing time and based on print data comprising current print data and preceding print data, said method comprising the steps of:
   determining whether the current print data is data that requires the developing time to develop into pattern data to be long; and
   controlling the recording means to ordinarily execute recording for the current print data in response to a determination in said determining step that the current print data requires the long developing time, and controlling the recording means to delay recording for the current print data to fix ink droplets ejected for the preceding print data in response to a determination in said determining step that the current print data does not require the long developing time.

25. A method according to claim 24, further comprising the step of inputting print data.

26. A method according to claim 24, wherein the recording means comprises a serial printer and said controlling step delays recording for the current print data by a scanning line unit in response to a determination result in said determining step that the current print data does not require the long developing time.

27. A method according to claim 24, wherein said controlling step delays recording for the current print data by transmitting no pattern data for recording after an end of recording by one line.

28. A method according to claim 24, wherein said controlling step delays recording by disabling the recording means in a predetermined time after an end of recording by one line.

29. A method according to claim 24, wherein the recording means ejects ink drops by means of thermal energy.

30. A method according to claim 24, further comprising the step of applying heat for accelerated drying of the ink drops ejected on the recording medium.

31. A method according to claim 24, wherein the print data determined in said determining step to require the long developing time comprises outline font data.

32. A method according to claim 24, wherein the print data determined in said determining step to require the long developing time comprises data read out from a magnetic storage medium.

33. A method according to claim 24, further comprising a step of discriminating whether the recording medium has a good ink-fixing property, wherein said controlling step controls recording to ordinarily execute recording for the current print data in response to a determination in said determining step that the current print data requires the long developing time and in response to a discrimination in said discriminating step that the recording medium has the good ink-fixing property, and controls recording to delay recording for the current print data to fix ink droplets ejected for the preceding print data in response to a determination in said determining step that the current print data does not require the long developing time and in response to a discrimination in said discriminating step that the recording medium does not have the good ink-fixing property.

34. A method according to claim 33, wherein said discriminating step discriminates whether the recording medium has the good ink-fixing property in response to information from a sensor.

35. A method according to claim 33, wherein said discriminating step discriminates whether the recording medium has the good ink-fixing property in response to designation by an operator.

36. A method according to claim 33, wherein said discriminating step discriminates whether the recording medium has the good ink-fixing property depending on whether the recording medium is a postcard.

37. A method of controlling recording in a recording apparatus having recording means for recording on a recording medium by ejecting ink drops based on print data, the print data being of a heavy printing duty or not of a heavy printing duty and comprising current print data and subsequent print data, said method comprising the steps of:

determining whether the current print data has the heavy printing duty; and controlling the recording means to ordinarily execute recording for the subsequent print data in response to a determination in said determining step that the current print data does not have the heavy printing duty, and controlling the recording means to delay recording for the subsequent print data to fix ink droplets ejected for the current print data in response to a determination in said determining step that the current print data has the heavy printing duty.

38. A method according to claim 37, further comprising a step of designating a fixing mode, wherein said controlling step controls the recording means to ordinarily execute recording for the subsequent print data regardless of a determination in said determining step when the fixing mode is not designated in said designating step, and controlling the recording means to delay recording for the subsequent print data to fix ink droplets ejected for the current print data in response to a determination in said determining step that the current print data has the heavy printing duty when the fixing mode is designated by said designation step.

39. A method according to claim 37, further comprising the step of inputting print data.

40. A method according to claim 37, wherein the recording means comprises a serial printer and said controlling step delays recording for the subsequent print data after recording for the last line of the current print data.

41. A method according to claim 37, wherein said controlling step delays recording for the subsequent print data by transmitting no pattern data for recording after an end of recording by one line.

42. A method according to claim 37, wherein said controlling step delays recording for the subsequent print data by disabling the recording means in a predetermined time after an end of recording by one line.

43. A method according to claim 37, wherein the recording means ejects ink drops by means of thermal energy.

44. A method according to claim 37, further comprising the step of applying a heater for accelerated drying of the ink drops ejected on the recording medium.

45. A method according to claim 37, wherein the print data determined in said determining step to have the heavy printing duty comprises black-dominant data.

46. A method according to claim 37, wherein the print data determined in said determining step to have the heavy printing duty comprises an illustration.

\* \* \* \* \*

UNITED STATES PATENT AND TRADEMARK OFFICE
CERTIFICATE OF CORRECTION

| | | |
|---|---|---|
| PATENT NO. : | 5,638,098 | Page 1 of 2 |
| DATED : | June 10, 1997 | |
| INVENTOR(S) : | Kazuya Iwata, et al. | |

It is certified that error appears in the above-identified patent and that said Letters Patent is hereby corrected as shown below:

ON THE COVER PAGE

AT [56] References Cited - U.S. PATENT DOCUMENTS:

"4,453,588   6/1984   Fukui" should read
--4,543,588   9/1985   Fukui--.

Figure 13B:
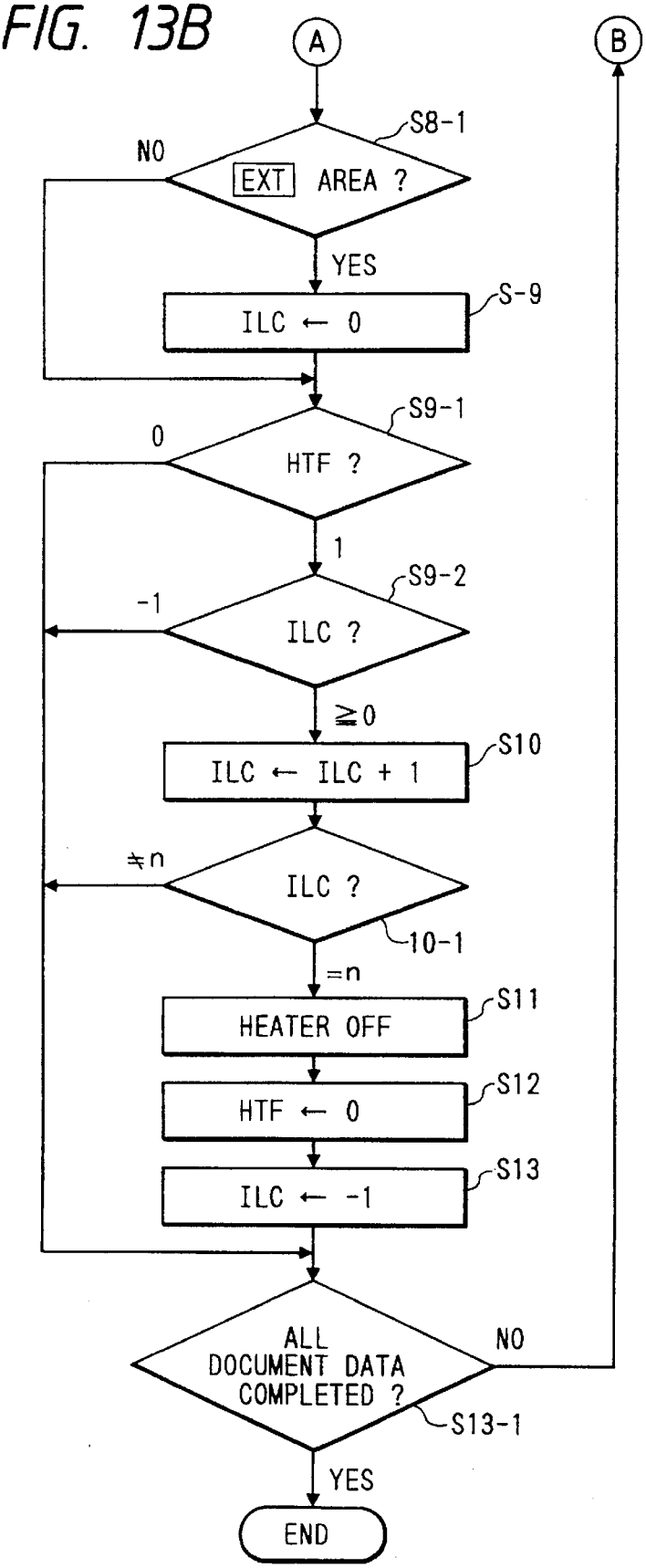

COLUMN 5:

Line 30, "viewprinter" should read --view-- and "comprising a printer" should read --showing an ink-jet printer--;
Line 49, "FIGS. 13, 13A and 13B are a flow charts" should read --FIG. 13, which is comprised of FIGS. 13A and 13B, is a flow chart--.

COLUMN 10:

Line 55, "need" should read --can--.

COLUMN 12:

Line 39, "comprises" should read --comprise--.

UNITED STATES PATENT AND TRADEMARK OFFICE
CERTIFICATE OF CORRECTION

PATENT NO. : 5,638,098
DATED : June 10, 1997
INVENTOR(S) : Kazuya Iwata, et al.

It is certified that error appears in the above-indentified patent and that said Letters Patent is hereby corrected as shown below:

COLUMN 15:

Line 41, "Otherwise" should begin a new paragraph.

COLUMN 18:

Line 66, "10" should be deleted.

Signed and Sealed this

Nineteenth Day of May, 1998

Attest:

BRUCE LEHMAN

Attesting Officer　　Commissioner of Patents and Trademarks